(12) United States Patent
Zhang et al.

(10) Patent No.: US 11,659,393 B2
(45) Date of Patent: *May 23, 2023

(54) METHOD, APPARATUS, AND SYSTEM FOR PERFORMING AN ESTABLISHMENT OF A SECURITY CONTEXT BETWEEN USER EQUIPMENT AND AN ACCESS NODE

(71) Applicant: HUAWEI TECHNOLOGIES CO., LTD., Guangdong (CN)

(72) Inventors: Dongmei Zhang, Shenzhen (CN); Jing Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 87 days.

This patent is subject to a terminal disclaimer.

(21) Appl. No.: 17/030,926

(22) Filed: Sep. 24, 2020

(65) Prior Publication Data

US 2021/0076214 A1    Mar. 11, 2021

Related U.S. Application Data

(63) Continuation of application No. 16/537,330, filed on Aug. 9, 2019, now Pat. No. 10,812,256, which is a
(Continued)

(30) Foreign Application Priority Data

Feb. 22, 2012 (CN) .......................... 201210041047.3

(51) Int. Cl.
*H04W 12/08* (2021.01)
*H04L 9/08* (2006.01)
(Continued)

(52) U.S. Cl.
CPC ............. *H04W 12/08* (2013.01); *H04L 9/083* (2013.01); *H04L 9/0816* (2013.01);
(Continued)

(58) Field of Classification Search
CPC ... H04W 12/08; H04W 12/02; H04W 12/033; H04W 12/037; H04W 12/04;
(Continued)

(56) References Cited

U.S. PATENT DOCUMENTS

2005/0078828 A1* 4/2005 Zheng .................... H04W 8/245
380/270
2005/0111666 A1* 5/2005 Blom ................... H04W 12/041
380/277
(Continued)

FOREIGN PATENT DOCUMENTS

WO    2008092999 A1    8/2008
WO    2009020789 A2    2/2009

OTHER PUBLICATIONS

3GPP TS 33.401 v11.2.0, "3rd Generation Partnership Project; Technical Specification Group Services and System Aspects; 3GPP System Architecture Evolution (SAE): Security Architecture (Release 11)". Dec. 2011 (Year: 2011).*
(Continued)

*Primary Examiner* — Henry Tsang
(74) *Attorney, Agent, or Firm* — Fish & Richardson P.C.

(57) ABSTRACT

Embodiments of the present invention disclose a method, an apparatus, and a system for establishing a security context and relates to the communications field, so as to comprehensively protect UE data. The method includes: acquiring an encryption algorithm of an access node; acquiring a root key and deriving, according to the root key and the encryption algorithm, an encryption key of the access node; sending the encryption key and the encryption algorithm to the access node, so that the access node starts downlink encryption and uplink decryption; sending the encryption algorithm of the access node to the UE so as to negotiate the encryption algorithm with the UE; and instructing the access node to start downlink encryption and uplink decryption and
(Continued)

instructing, during algorithm negotiation, the UE to start downlink decryption and uplink encryption.

15 Claims, 13 Drawing Sheets

Related U.S. Application Data continuation of application No. 16/140,217, filed on Sep. 24, 2018, now Pat. No. 10,735,185, which is a continuation of application No. 15/594,975, filed on May 15, 2017, now Pat. No. 10,084,594, which is a continuation of application No. 14/460,748, filed on Aug. 15, 2014, now Pat. No. 9,673,974, which is a continuation of application No. PCT/CN2013/071759, filed on Feb. 22, 2013.

(51) Int. Cl.

| | |
|---|---|
| *H04L 9/40* | (2022.01) |
| *H04W 36/00* | (2009.01) |
| *H04W 12/02* | (2009.01) |
| *H04W 12/04* | (2021.01) |
| *H04W 12/06* | (2021.01) |
| *H04W 12/033* | (2021.01) |
| *H04W 12/037* | (2021.01) |
| *H04W 12/041* | (2021.01) |
| *H04W 12/069* | (2021.01) |
| *H04W 12/0433* | (2021.01) |

(52) U.S. Cl.
CPC ............ *H04L 9/0861* (2013.01); *H04L 63/06* (2013.01); *H04L 63/205* (2013.01); *H04W 12/02* (2013.01); *H04W 12/033* (2021.01); *H04W 12/037* (2021.01); *H04W 12/04* (2013.01); *H04W 12/041* (2021.01); *H04W 12/0433* (2021.01); *H04W 12/06* (2013.01); *H04W 12/069* (2021.01); *H04W 36/0038* (2013.01); *H04L 2209/24* (2013.01); *H04L 2463/061* (2013.01)

(58) Field of Classification Search
CPC .......... H04W 12/041; H04W 12/0433; H04W 12/06; H04W 12/069; H04W 36/0038; H04L 9/0816; H04L 9/083; H04L 9/0861; H04L 63/06; H04L 63/205; H04L 2209/24; H04L 2463/061
See application file for complete search history.

(56) References Cited

U.S. PATENT DOCUMENTS

| | | | | |
|---|---|---|---|---|
| 2010/0095123 | A1* | 4/2010 | He | H04L 9/0844 713/171 |
| 2010/0293595 | A1* | 11/2010 | Naslund | H04L 63/205 726/1 |
| 2011/0105124 | A1* | 5/2011 | Hapsari | H04W 12/041 455/436 |

OTHER PUBLICATIONS

ETSI TS 136 423 v10.1.0, "LTE; Evolved Universal Terrestrial Radio Access Network (E-UTRAN); X2 Application Protocol (X2AP) (3GPPTS 36.423 version 10.1.0 Release 10)", Apr. 2011, pp. 17, 30-36 (Year: 2011).*
3GPP TS 33.401 v11.2.0, "3rd Generation Partnership Project; Technical Specification Group Services and System Aspects; 3GPP System Architecture Evolution (SAE): Security Architecture (Release 11)". Dec. 2011 (Year 2011).
Wikipedia, "Handover", Apr. 18, 2010 (Year: 2010).
Alg-Id et al., "LTE Security," Jan. 31, 2011, retrieved on Nov. 27, 2014, retrieved from URL<http://www.nmcgroups.com/files/download/NMC.LTE Security.v1.0.pdf>, 1 page.
Extended European Search Report in European Application No. 20214432.5, dated Jun. 28, 2021, 11 pages.

* cited by examiner

METHOD, APPARATUS, AND SYSTEM FOR PERFORMING AN ESTABLISHMENT OF A SECURITY CONTEXT BETWEEN USER EQUIPMENT AND AN ACCESS NODE

CROSS-REFERENCE TO RELATED APPLICATIONS

This application is a continuation of U.S. patent application Ser. No. 16/537,330, filed on Aug. 9, 2019, which is a continuation of U.S. patent application Ser. No. 16/140,217, filed on Sep. 24, 2018, now U.S. Pat. No. 10,735,185, which is a continuation of U.S. patent application Ser. No. 15/594,975, filed on May 15, 2017, now U.S. Pat. No. 10,084,594, which is a continuation of U.S. patent application Ser. No. 14/460,748, filed on Aug. 15, 2014, now U.S. Pat. No. 9,673,974, which is a continuation of International Application No. PCT/CN2013/071759, filed on Feb. 22, 2013. The International Application claims priority to Chinese Patent Application No. 201210041047.3, filed on Feb. 22, 2012. All of the afore-mentioned patent applications are hereby incorporated by reference in their entireties.

TECHNICAL FIELD

Embodiment of the present invention relate to the communications field, and in particular, to a method, an apparatus, and a system for establishing a security context.

BACKGROUND

A Long Term Evolution Hi (Long Term Evolution Hi, LTE Hi) architecture is a network architecture that is oriented to fixed and low-speed scenarios and relies upon existing mobile communications technologies. In the LTE Hi architecture, a user equipment (User Equipment, UE) initially establishes a primary carrier cell connection (Primary Carrier Cell, PCC) with a base station to connect to a core network. When a network traffic load increases to a limit value set by an operator, the base station configures a secondary carrier cell connection (Secondary Carrier Cell, SCC) for the UE through upper layer signaling and the UE is connected to the core network through an access node. User plane data and control plane data can be transmitted on the PCC, while only the user plane data can be transmitted on the SCC. The base station can transmit different UE services by hierarchy according to a quality of service (Quality of Service, QoS) requirement, an operator strategy, and the like. For example, a voice or video service with a relatively high quality of service requirement is transmitted on the PCC and a service with low additional values such as an a short message service is transmitted on the SCC. For a Uu interface on the PCC, context security protection is performed in an encryption and integrity protection manner on user plane data and/or control plane data transmitted over the Uu interface.

Although the Uu interface on the PCC is enabled with security protection, a Uu' interface on the SCC is not enabled with security protection and thus transmission security of user plane data transmitted over the Uu' interface cannot be ensured.

SUMMARY

Embodiments of the present invention provide a method, an apparatus, and a system for establishing a security context, so as to implement comprehensive security protection for UE data.

In one aspect, an embodiment of the present invention provides a method for establishing a security context, including:

acquiring an encryption algorithm of an access node, acquiring a root key and deriving an encryption key of the access node according to the root key and the encryption algorithm;

sending the encryption key and the encryption algorithm to the access node, so that the access node starts downlink encryption and uplink decryption;

sending the encryption algorithm of the access node to a UE so as to negotiate the encryption algorithm with the UE; and instructing the access node to start downlink encryption and uplink decryption and instructing, during algorithm negotiation, the UE to start downlink decryption and uplink encryption.

In another aspect, an embodiment of the present invention further provides a method for establishing a security context, including:

receiving an encryption key sent by a base station;

acquiring an encryption algorithm; and starting downlink encryption and uplink decryption according to the encryption key and the encryption algorithm.

In another aspect, an embodiment of the present invention further provides a method for establishing a security context, including:

sending a root key to an access node, where the root key is used by the access node to derive an encryption key used by the access node;

acquiring an encryption algorithm used by the access node, where the encryption algorithm is selected by the access node according to a security capability and security policy of the access node as well as a security capability of an UE;

sending the encryption algorithm of the access node to the UE so as to negotiate the encryption algorithm with the UE; and instructing the access node to start downlink encryption and uplink decryption and instructing, during algorithm negotiation, the UE to start downlink decryption and uplink encryption.

In another aspect, an embodiment of the present invention further provides a method for establishing a security context, including:

receiving a root key sent by a base station;

selecting an encryption algorithm according to its own security capability and security policy as well as a security capability of the UE;

deriving an encryption key according to the root key and the encryption algorithm;

sending the encryption algorithm to the base station, so that the base station negotiates the encryption algorithm with the UE; and starting downlink encryption and uplink decryption according to a startup indication of the base station.

In another aspect, an embodiment of the present invention further provides a method for establishing a security context, including:

receiving an encryption algorithm of an access node sent by a base station so as to complete algorithm negotiation with the base station;

deriving an encryption key of a UE according to a root key and the encryption algorithm, where the root key is derived after authentication by the UE and a network; and starting downlink decryption and uplink encryption after deriving the encryption key of the UE.

In another aspect, an embodiment of the present invention further provides a base station, including:

an acquirer, configured to acquire an encryption algorithm of an access node, where the acquirer is configured to acquire a root key;

a processor, connected to the acquirer and configured to derive, according to the root key and the encryption algorithm acquired by the acquirer, an encryption key of the access node;

a sender, connected to the processor and the acquirer and configured to send the encryption key derived by the processor and the encryption algorithm acquired by the acquirer to the access node, so that the access node starts downlink encryption and uplink decryption, where the sender is configured to send the encryption algorithm acquired by the acquirer to a UE so as to negotiate the encryption algorithm with the UE; and a notifier, configured to instruct the access node to start downlink encryption and uplink decryption and instruct, during algorithm negotiation, the UE to start downlink decryption and uplink encryption.

In another aspect, an embodiment of the present invention further provides an access node, including:

a receiver, configured to receive an encryption key sent by a base station:

an acquirer, configured to acquire an encryption algorithm; and a processor, connected to the receiver and the acquirer and configured to start, according to the encryption key received by the receiver and the encryption algorithm acquired by the acquirer, downlink encryption and uplink decryption.

In another aspect, an embodiment of the present invention further provides a base station, including:

a sender, configured to send a root key to a access node, where the root key is used by the access node to derive an encryption key used by the access node:

an acquirer, configured to acquire an encryption algorithm used by the access node, where the encryption algorithm is selected by the access node according to a security capability and security policy of the access node as well as a security capability of a UE, where the sender is connected to the acquirer and configured to send the encryption algorithm acquired by the acquirer to the UE so as to negotiate the encryption algorithm with the UE; and a notifier, configured to instruct the access node to start downlink encryption and uplink decryption and instruct, during algorithm negotiation, the UE to start downlink decryption and uplink encryption.

In another aspect, an embodiment of the present invention further provides an access node, including:

a receiver, configured to receive a root key sent by a base station;

a processor, configured to select an encryption algorithm according to its own security capability and security policy as well as a security capability of a UE, where the processor is connected to the receiver and configured to derive, according to the root key received by the receiver and the encryption algorithm, an encryption key; and a sender, connected to the processor and configured to send the encryption algorithm selected by the processor to the base station, so that the base station negotiates the encryption algorithm with the UE, where the processor is configured to start downlink encryption and uplink decryption according to a startup indication of the base station.

In another aspect, an embodiment of the present invention further provides a user equipment UE, including:

a receiver, configured to receive an encryption algorithm of an access node sent by a base station so as to complete algorithm negotiation with the base station:

a processor, connected to the receiver and configured to derive, according to a root key and the encryption algorithm received by the receiver, an encryption key of the UE, where the root key is derived after authentication by the processor and a network; and the processor is further configured to start downlink decryption and uplink encryption after deriving the encryption key of the UE.

In another aspect, an embodiment of the present invention further provides a system for establishing a security context, including:

a base station, configured to acquire an encryption algorithm of an access node; acquire a root key; derive an encryption key of the access node according to the root key and the encryption algorithm; send the encryption key and the encryption algorithm to the access node, so that the access node starts downlink encryption and uplink decryption; send the encryption algorithm of the access node to a UE so as to negotiate the encryption algorithm with the UE; instruct the access node to start downlink encryption and uplink decryption; and instruct, during algorithm negotiation, the UE to start downlink decryption and uplink encryption;

the access node, configured to receive the encryption key sent by the base station, acquire the encryption algorithm, and start, according to the encryption key and the encryption algorithm, downlink encryption and uplink decryption; and the UE, configured to receive the encryption algorithm of the access node sent by the base station so as to complete algorithm negotiation with the base station; derive an encryption key of the UE according to the root key and the encryption algorithm, where the root key is derived after authentication by the UE and a network; and start downlink decryption and uplink encryption after deriving the encryption key of the UE.

In another aspect, an embodiment of the present invention further provides a system for establishing a security context, including:

a base station, configured to send a root key to a access node, where the root key is used by the access node to derive an encryption key used by the access node; acquire an encryption algorithm used by the access node, where the encryption algorithm is selected by the access node according to a security capability and security policy of the access node as well as a security capability of a UE; send the encryption algorithm of the access node to the UE so as to negotiate the encryption algorithm with the UE; instruct the access node to start downlink encryption and uplink decryption; and instruct, during algorithm negotiation, the UE to start downlink decryption and uplink encryption;

the access node, configured to receive the root key sent by the base station select the encryption algorithm according to its own security capability and security policy as well as the security capability of the UE; derive the encryption key according to the root key and the encryption algorithm; send the encryption algorithm to the base station, so that the base station negotiates the encryption algorithm with the UE; and start downlink encryption and uplink decryption according to a startup indication of the base station; and the UE, configured to receive the encryption algorithm of the access node sent by the base station so as to complete algorithm negotiation with the base station; derive an encryption key of the UE according to the root key and the encryption algorithm, where the root key is derived after authentication by the UE and a network; and start downlink decryption and uplink encryption after deriving the encryption key of the UE.

According to the method, apparatus, and system for establishing a security context provided in the embodiments of the present invention, encryption algorithms can be selected for an access node and a UE, and encryption keys can be derived at access node and UE sides according to a root key and the selected encryption algorithms. By means of algorithm negotiation, encryption generation, and synchronous encryption protection startup, encryption protection is performed on user plane data transmitted over a Uu' interface, which can solve a problem in the prior art that the user plane data transmitted over the Uu' interface is not protected and can implement comprehensive security protection for UE data.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In embodiments of the present invention, an Hi AP (Hi Access Point) used as an access node is used as an example for description, and a UE is connected to a core network by using a Uu interface through a base station and connected to the core network by using a Uu' interface through the Hi AP. In a practical application, no limitation is posed on an available access node.

Embodiment 1

Figure 1:
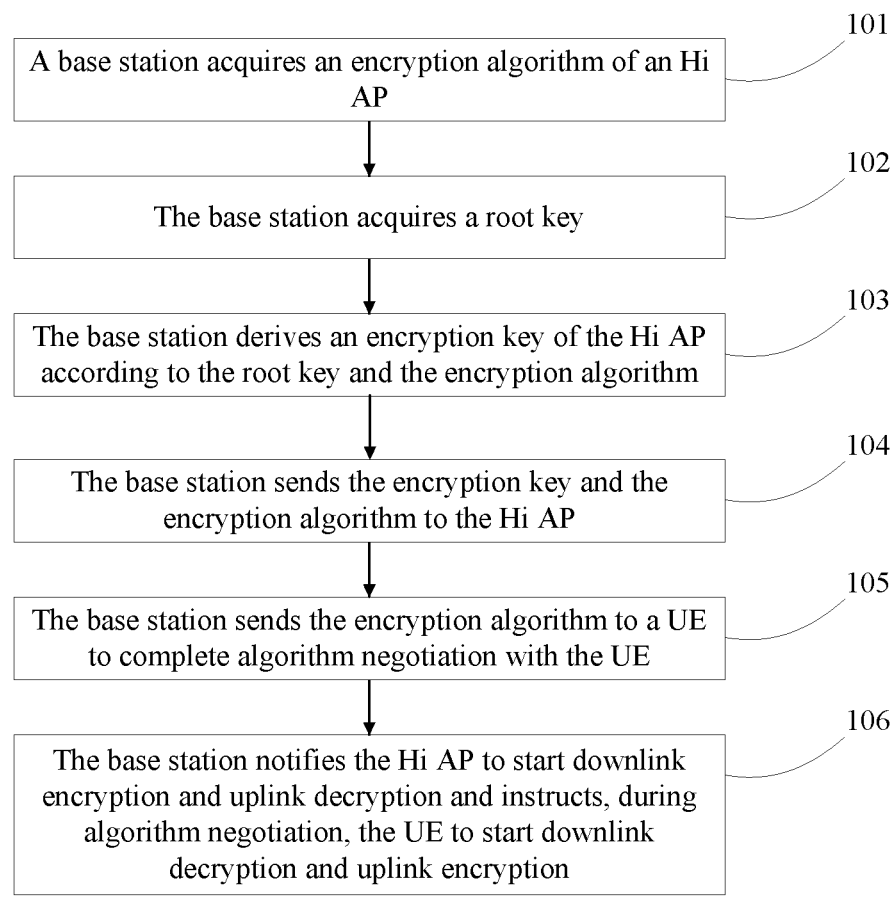
FIG. 1 is a flowchart of a method for establishing a security context in Embodiment 1 of the present invention.

The embodiment of the present invention provides a method for establishing a security context. As shown in FIG. 1, the method includes the following steps:

101: A base station acquires an encryption algorithm of an Hi AP.

The encryption algorithm is used to perform encryption protection on user plane data transmitted on an SCC. In the embodiment of the present invention, an advanced encryption standard (Advanced Encryption Standard. AES) algorithm used as the encryption algorithm is used as an example for description, which is not limited in a practical application.

102: The base station acquires a root key.

The root key is used to derive an encryption key.

103: The base station derives an encryption key of the Hi AP according to the root key and the encryption algorithm.

Encryption key derivation needs to be performed at both an Hi AP side and a UE side. This step describes derivation of the encryption key of the Hi AP and an encryption key at the UE side is derived by a UE itself.

It should be noted that a symmetric key encryption method is used as an example for description in the embodiment of the present invention and thus a same root key is used to derive the encryption key at the Hi AP side and the UE side. In a practical application, a root key at the Hi AP side is delivered to the base station by an MME after authentication, and a root key at the UE side is derived according to a permanent key stored in a UE card. Because the root keys used at the Hi AP side and the UE side to derive the encryption key are the same and both used algorithms are an AES algorithm, encryption keys derived at the Hi AP side and the UE side are also the same.

104: The base station sends the encryption key and the encryption algorithm to the Hi AP.

Because the base station selects the encryption algorithm and derives the encryption key for the Hi AP, the base station sends the encryption key and the encryption algorithm to the Hi AP, so that the Hi AP starts downlink encryption and uplink decryption.

105: The base station sends the encryption algorithm to the UE to complete algorithm negotiation with the UE.

Both the Hi AP side and the UE side need to derive the encryption key based on the root key and the encryption algorithm. Therefore, a purpose for sending the encryption algorithm to the UE in this step is to enable, after the UE obtains the root key, the UE to obtain the encryption algorithm, so that the UE can derive the encryption key.

106: The base station instructs the Hi AP to start downlink encryption and uplink decryption and instructs, during algorithm negotiation, the UE to start downlink decryption and uplink encryption.

After receiving the encryption algorithm sent by the base station, the UE derives the encryption key according to the encryption algorithm and a root key in the UE card. After the base station instructs the Hi AP and the UE to start decryption and encryption, the Hi AP and the UE may encrypt uplink data and downlink data according to the same encryption algorithm and the encryption key.

According to the method for establishing a security context provided in the embodiment of the present invention, an encryption algorithm of an Hi AP can be acquired, and an encryption key can be derived for the Hi AP according to the root key and the acquired encryption algorithm. By means of algorithm negotiation, encryption generation, and synchronous encryption protection startup, encryption protection is performed on user plane data transmitted over a Uu' interface, which can solve a problem in the prior art that the user plane data transmitted over the Uu interface is not protected and can implement comprehensive security protection for UE data.

Embodiment 2

Figure 2:
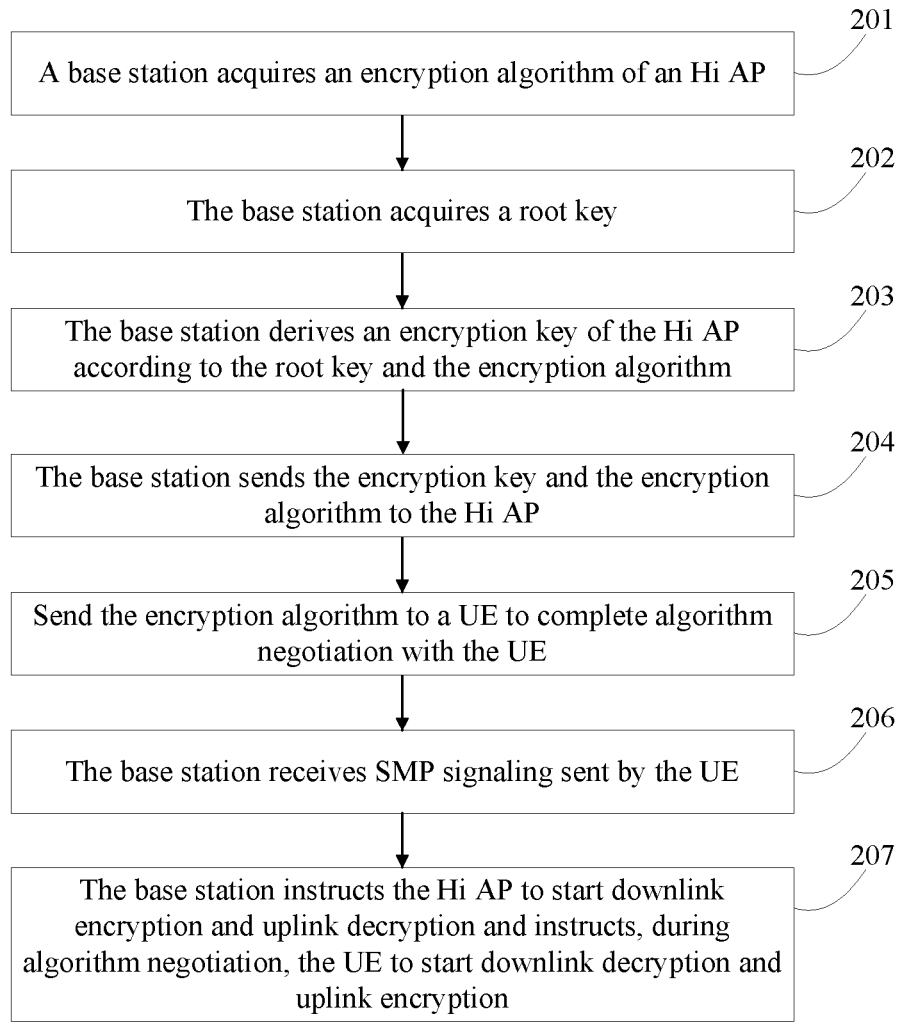
FIG. 2 is a flowchart of a method for establishing a security context in Embodiment 2 of the present invention.

The embodiment of the present invention provides a method for establishing a security context. The method is a further extension of Embodiment 1. As shown in FIG. 2, the method includes the following steps:

201: A base station acquires an encryption algorithm of an Hi AP

The encryption algorithm is used to perform encryption protection on user plane data transmitted on an SCC. In the embodiment of the present invention, an AES algorithm used as the encryption algorithm is used as an example for description, which is not limited in a practical application.

The base station may acquire the encryption algorithm in at least two manners:

1) The base station receives the AES algorithm selected by the Hi AP, where the AES algorithm is a highest-priority encryption algorithm selected by the Hi AP according to a security capability and security policy of the Hi AP as well as a security capability of a UE. Before receiving the AES algorithm selected by the Hi AP, the base station needs to send the security capability of the UE to the Hi AP, so that the Hi AP selects the encryption algorithm.

2) The base station receives a security capability and a security policy of the Hi AP and selects, according to the security capability and security policy of the Hi AP and a security capability of the UE, the highest-priority encryption algorithm.

202: The base station acquires a root key.

The root key is used to derive an encryption key.

203: The base station derives an encryption key of the Hi AP according to the root key and the encryption algorithm.

Encryption key derivation needs to be performed at both an Hi AP side and a UE side. This step describes derivation of the encryption key of the Hi AP and an encryption key at the UE side is derived by the UE itself.

It should be noted that a symmetric key encryption method is used as an example for description in the embodiment of the present invention and thus a same root key is used to derive the encryption key at the Hi AP side and the UE side. In a practical application, a root key at the Hi AP side is delivered to the base station by an MME after authentication, and a root key at the UE side is derived according to a permanent key stored in a UE card. Because the root keys used at the Hi AP side and the UE side to derive the encryption key are the same and both used algorithms are an AES algorithm, encryption keys derived at the Hi AP side and the UE side are also the same.

The base station derives the encryption key according to the root key and the encryption algorithm. The root key is derived according to a permanent key shared by the UE and a network side. The root key may be KeNB in the embodiment and is not limited in a practical application. The base station derives an encryption key Kupenc according to the KeNB and sends the Kupenc to the Hi AP. The Kupenc is used to perform encryption protection on the user plane data transmitted on the SCC.

204: The base station sends the encryption key and the encryption algorithm to the Hi AP.

Because the base station selects the encryption algorithm and derives the encryption key for the Hi AP but a using subject of the encryption algorithm and the encryption key is the Hi AP, the base station sends the encryption key and the encryption algorithm to the Hi AP, so that the Hi AP starts downlink encryption and uplink decryption.

205: The encryption algorithm is sent to the UE to complete algorithm negotiation with the UE.

The base station sends a security mode command (Security Mode Command, SMC) to the UE, where the SMC carries the AES algorithm. After receiving the AES algorithm sent by the base station, the UE completes algorithm negotiation and derives, according to the AES algorithm and the KeNB shared between the UE and the base station, the Kupenc.

Both the Hi AP side and the UE side need to derive the encryption key based on the root key and the encryption algorithm. Therefore, a purpose for sending the encryption algorithm to the UE in this step is to enable, after the UE obtains the root key, the UE to obtain the encryption algorithm, so that the UE can derive the encryption key.

It should be noted that a symmetric key encryption method is used as an example for description in the embodiment of the present invention and thus a same root key is used to derive the encryption key at the Hi AP side and the UE side. In a practical application, a root key at the Hi AP side is sent by a core network, and a root key at the UE side is locally derived according to a permanent key after authentication by the UE and a network. Because the root keys used at the Hi AP side and the UE side to derive the encryption key are the same and both used algorithms are an AES algorithm, encryption keys derived at the Hi AP side and the UE side are also the same.

Optionally, the root key used to derive the encryption key at the Hi AP side and the UE side may also be KeNB* that is derived according to the KeNB. In addition to deriving the encryption key for user plane data over a Uu' interface, the KeNB is further used to derive the encryption key Kupenc for user plane data over a Uu interface as well as an integrity protection key Krrcint and an encryption key Krrcenc for control plane data over the Uu interface. When the Uu' interface uses the KeNB* to derive the root key, Kupenc* that is derived is different from the Kupenc derived for the Uu interface.

206: The base station receives SMP signaling sent by the UE.

The UE sends a security mode complete (Security Mode Complete, SMP) command to the base station, where the SMP is used to notify the base station that the UE has completed encryption key derivation according to the encryption algorithm and the root key.

207: The base station instructs the Hi AP to start downlink encryption and uplink decryption and instructs, during algorithm negotiation, the UE to start downlink decryption and uplink encryption.

After both the Hi AP side and the UE side derive the encryption key, the base station instructs, when the Hi AP starts downlink encryption and uplink decryption, the UE to start downlink decryption and uplink encryption. Because the Hi AP is a sender of downlink data and a receiver of uplink data, the Hi AP starts downlink encryption and uplink decryption. Likewise, because the UE is a receiver of the downlink data and a sender of the uplink data, the UE starts downlink decryption and uplink encryption.

Preferably, before a security context is established for the Uu' interface, a security context may also be established for the Uu interface, which is specifically as follows:

The base station selects an encryption algorithm for the Uu interface. In the embodiment of the present invention, it is assumed that the AES algorithm is used as a control plane data integrity protection algorithm, a control plane data encryption algorithm, and a user plane data encryption algorithm, a control plane data encryption algorithm, and a user plane data encryption algorithm is used as an example for description, and two of the three may be different in a practical application. After selecting the encryption algorithm, the base station derives keys for the Uu interface according to the root key and the AES algorithm, where the root key may be the KeNB. Because the user plane data and the control plane data are transmitted over the Uu interface, the keys that the base station derives for the Uu interface include: a user plane data encryption key Kupenc, a control plane data integrity protection key Krrcint, and a control plane data encryption key Krrcenc. The base station sends the selected AES algorithm to the UE by using the SMC and the UE derives the Kupenc, Krrcint, and Krrcenc according to the AES algorithm and the root key KeNB.

Optionally, if the base station does not send, in a process of establishing a security context for the Uu interface, the AES algorithm to the UE, the encryption algorithm selected for the Uu interface and the encryption algorithm selected for the U interface may also be sent to the UE together in step 205, so as to complete algorithm negotiation with the UE.

According to the method for establishing a security context provided in the embodiment of the present invention, encryption algorithms of an Hi AP and a UE can be acquired, and encryption keys used by the Hi AP and the UE can be derived at a base station side and a UE side according to a root key and the acquired encryption algorithms. By means of algorithm negotiation, encryption generation, and synchronous encryption protection startup, encryption protection is performed on user plane data transmitted over a Uu' interface on an SCC, which can solve a problem in the prior art that the user plane data transmitted over the Uu' interface is not protected and can implement comprehensive security protection for UE data.

In addition, according to the method for establishing a security context provided in the embodiment of the present invention, a root key different from a root key that is used to derive a key for a Uu interface may also be used to derive an encryption key for an Hi AP. For example, KeNB* derived according to KeNB may be used as the root key for the Hi AP to derive the encryption key. Using different root keys for data transmitted over a Uu interface and data transmitted over the Uu' interface can further enhance data security.

In addition, according to the method for establishing a security context provided in the embodiment of the present invention, in an algorithm negotiation phase, a base station can further represent the Uu interface and the Uu' interface at the same time to perform algorithm negotiation with a UE, which reduces steps of signaling interaction.

Embodiment 3

Figure 3:
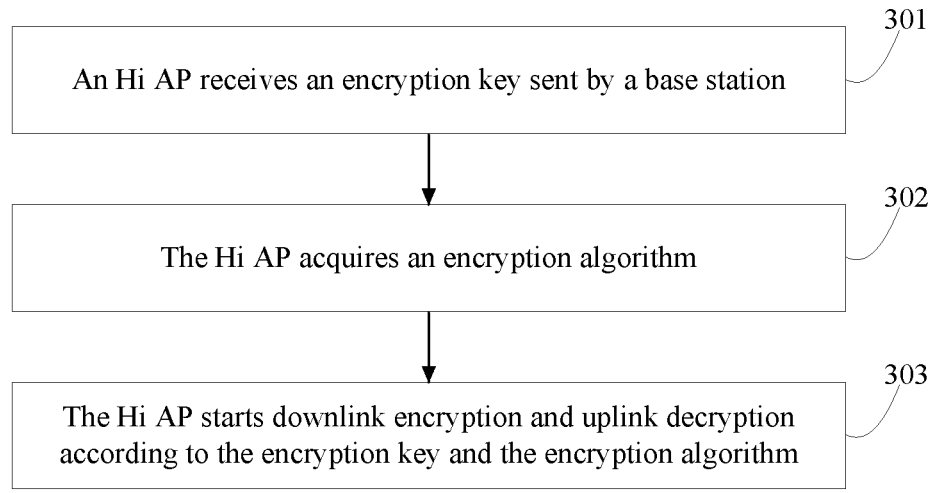
FIG. 3 is a flowchart of a method for establishing a security context in Embodiment 3 of the present invention.
Figure 4:
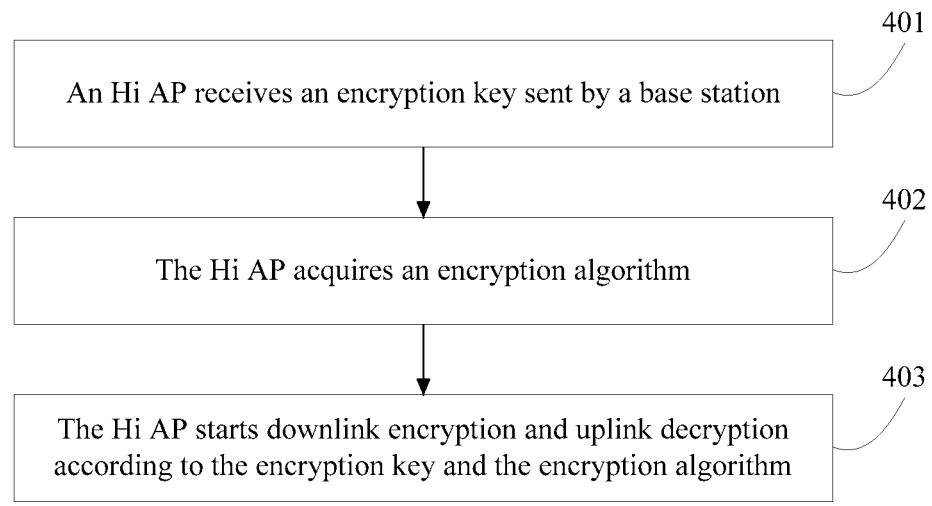
FIG. 4 is a flowchart of a method for establishing a security context in Embodiment 4 of the present invention.

The embodiment of the present invention provides a method for establishing a security context. As shown in FIG. 3, the method includes the following steps:

301: An Hi AP receives an encryption key sent by a base station.

Encryption key derivation needs to be performed at both an Hi AP side and a UE side. This step describes that the Hi AP receives the encryption key derived by the base station and an encryption key at the UE side is derived by a UE itself.

It should be noted that a symmetric key encryption method is used as an example for description in the embodiment of the present invention and thus a same root key is used to derive the encryption key at a base station side and the UE side. In a practical application, a root key at the base station side is delivered to the base station by an MME after authentication, and the base station derives the encryption key for the Hi AP according to the root key and an encryption algorithm. The root key at the UE side is derived according to a permanent key stored in a UE card. Because the root keys used at the base station side and the UE side to derive the encryption key are the same and both used algorithms are an AES algorithm, encryption keys derived at the base station side and the UE side are also the same.

302: The Hi AP acquires the encryption algorithm.

The Hi AP acquires the encryption algorithm in two manners:

1) The Hi AP acquires an encryption algorithm sent by the base station, where the encryption algorithm is selected by the base station.

2) The Hi AP selects the encryption algorithm according to its own security capability and security policy as well as a security capability of the UE. After selecting the encryption algorithm, the Hi AP further sends the selected encryption algorithm to the base station, so that the base station performs algorithm negotiation with the UE.

303: The Hi AP starts downlink encryption and uplink decryption according to the encryption key and the encryption algorithm.

Meanwhile, the base station sends the encryption algorithm of the Hi AP to the UE, so that the UE derives the encryption key at the UE side according to the encryption algorithm and a root key in the UE card. After deriving the encryption key, the UE starts uplink encryption and downlink decryption according to an indication of the base station. Because the Hi AP side and the UE side use the same encryption algorithm and the same encryption key, encryption protection may be performed on user plane data transmitted on an SCC.

According to the method for establishing a security context provided in the embodiment of the present invention, by means of algorithm negotiation, encryption generation, and synchronous startup of downlink encryption and uplink decryption, encryption protection can be performed, according to an encryption algorithm and an encryption key sent by a base station, on user plane data transmitted over a Uu' interface on an SSC, which can solve a problem in the prior art that the user plane data over the Uu' interface is not protected and can implement comprehensive security protection for UE data.

Embodiment 4

The embodiment of the present invention provides a method for establishing a security context. The method is a further extension of Embodiment 3. The method includes the following steps:

401: An Hi AP receives an encryption key sent by a base station.

Encryption key derivation needs to be performed at both an base station side and a UE side. This step describes that the base station derives an encryption key and an encryption key at the UE side is derived by a UE itself.

The base station acquires a root key and derives, according to the root key, the encryption key.

It should be noted that a symmetric key encryption method is used as an example for description in the embodiment of the present invention and thus a same root key is used to derive the encryption key at the base station side and the UE side. In a practical application, a root key at the base station side is delivered to the base station by an MME after authentication, and a root key at the UE side is derived according to a permanent key stored in a UE card. Because the root keys used at the base station side and the UE side to derive the encryption key are the same and both used algorithms are an AES algorithm, encryption keys derived at the base station side and the UE side are also the same.

The base station derives the encryption key according to the root key and the AES algorithm. The root key is derived according to a permanent key shared by the UE and a network side. The root key may be KeNB in the embodiment and is not limited in a practical application. The base station derives an encryption key Kupenc according to the KeNB and sends the Kupenc to the Hi AP. The Kupenc is used to perform encryption protection on user plane data transmitted on an SCC.

The Hi AP acquires the encryption key sent by the base station. Because the base station selects an encryption algorithm and derives the encryption key for the Hi AP but a using subject of the encryption algorithm and the encryption key is the Hi AR the base station sends the encryption key and the encryption algorithm to the Hi AP, so that the Hi AP starts downlink encryption and uplink decryption.

402: The Hi AP acquires the encryption algorithm.

The encryption algorithm is used to perform encryption protection on the user plane data transmitted on the SCC. In the embodiment of the present invention, the AES algorithm used as the encryption algorithm is used as an example for description, which is not limited in a practical application.

The Hi AP may acquire the encryption algorithm in at least two manners:

1) The Hi AP selects a highest-priority encryption algorithm according to its own security capability and security policy as well as a security capability of the UE. In the embodiment of the present invention, the AES algorithm is used as the encryption algorithm. Before selecting the AES algorithm, the Hi AP further needs to acquire the security capability of the UE sent by the base station, so as to select the AES algorithm. After selecting the AES algorithm, the Hi AP further needs to send the AES algorithm to the base station, so that the base station performs, according to the AES algorithm, algorithm negotiation with the UE.

2) The Hi AP acquires the encryption algorithm sent by the base station, where the encryption algorithm is a highest-priority encryption algorithm selected by the base station according to a security capability and a security policy of the Hi AP and a security capability of the UE. Before acquiring the encryption algorithm, the Hi AP further needs to send its own security capability and security policy to the base station, so that the base station selects the encryption algorithm.

It should be noted that, when the Hi AP selects the encryption algorithm, this step should be executed before step 401, so that the base station derives the encryption key for the Hi AP according to the encryption algorithm sent by the Hi AP and the root key and sends the encryption key to the Hi AP.

403: The Hi AP starts downlink encryption and uplink decryption according to the encryption key and the encryption algorithm.

Meanwhile, the base station sends the encryption algorithm to the UE to complete algorithm negotiation with the UE.

Specifically, the base station sends an SMC to the UE, where the SMC carries the AES algorithm. After receiving the AES algorithm sent by the base station, the UE completes algorithm negotiation and derives, according to the AES algorithm and the KeNB authenticated by the UE and a network, the Kupenc.

Both the base station side and the UE side need to derive the encryption key based on the root key and the encryption algorithm. Therefore, a purpose for sending the encryption algorithm to the UE in this step is to enable, after the UE obtains the root key, the UE to obtain the encryption algorithm, so that the UE can derive the encryption key.

It should be noted that a symmetric key encryption method is used as an example for description in the embodiment of the present invention and thus a same root key is used to derive the encryption key at the base station side and the UE side. In a practical application, a root key at the base station side is sent by a core network, and a root key at the UE side is locally derived according to a permanent key after authentication by the UE and a network. Because the root keys used at the base station side and the UE side to derive the encryption key are the same and both used algorithms are an AES algorithm, encryption keys derived at the base station side and the UE side are also the same.

Optionally, the root key used to derive the encryption key at the base station side and the UE side may also be KeNB* derived according to the KeNB. In addition to deriving the encryption key for user plane data over a Uu' interface, the KeNB is further used to derive the encryption key Kupenc for user plane data over a Uu interface as well as an integrity protection key Krrcint and an encryption key Krrcenc for control plane data over the Uu interface. When the Uu' interface uses the KeNB* to derive the root key, Kupenc* that is derived is different from the Kupenc derived for the Uu interface.

The base station receives an SMP sent by the UE, where the SMP is used to notify the base station that the UE has completed encryption key derivation according to the encryption algorithm and the root key.

The base station instructs, during algorithm negotiation, the UE to start downlink decryption and uplink encryption.

After both the base station side and the UE side derive the encryption key, the base station instructs, when the Hi AP starts downlink encryption and uplink decryption, the UE to start downlink decryption and uplink encryption. Because the Hi AP is a sender of downlink data and a receiver of uplink data, the Hi AP starts downlink encryption and uplink decryption. Likewise, because the UE is a receiver of the downlink data and a sender of the uplink data, the UE starts downlink decryption and uplink encryption.

Preferably, before a security context is established for the Uu' interface, a security context may also be established for the Uu interface, which is specifically as follows:

The base station selects an encryption algorithm for the Uu interface. In the embodiment of the present invention, the AES algorithm used as a control plane data integrity protection algorithm, a control plane data encryption algorithm, and a user plane data encryption algorithm is used as an example for description, and two of the three may be different in a practical application. After selecting the encryption algorithm, the base station derives keys for the Uu interface according to the root key and the AES algorithm, where the root key may be the KeNB. Because the user plane data and the control plane data are transmitted over the Uu interface, the keys that the base station derives for the Uu interface include: a user plane data encryption key Kupenc, a control plane data integrity protection key Krrcint, and a control plane data encryption key Krrcenc. The base station sends the selected AES algorithm to the UE by using the SMC and the UE derives the Kupenc, Krrcint, and Krrcenc according to the AES algorithm and the root key KeNB.

According to the method for establishing a security context provided in the embodiment of the present invention, by means of algorithm negotiation, encryption generation, and synchronous startup of downlink encryption and uplink decryption, encryption protection can be performed according to an encryption algorithm and an encryption key sent by a base station on user plane data transmitted over a Uu' interface on an SSC, which can solve a problem in the prior art that the user plane data over the Uu' interface is not protected and can implement comprehensive security protection for UE data.

Embodiment 5

Figure 5:
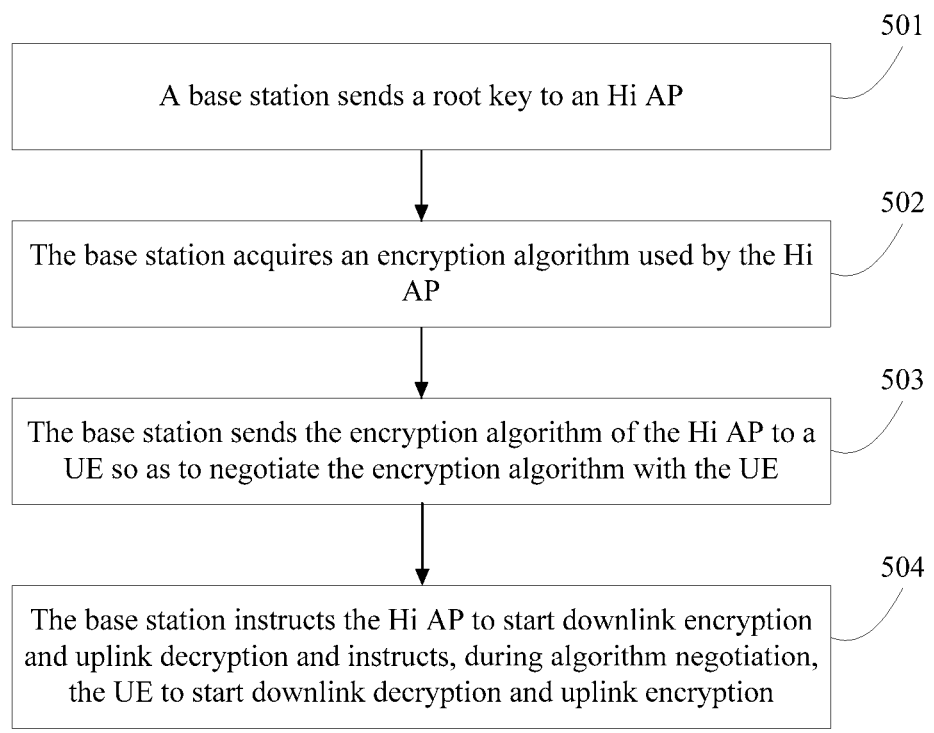
FIG. 5 is a flowchart of a method for establishing a security context in Embodiment 5 of the present invention.

The embodiment of the present invention provides a method for establishing a security context. As shown in FIG. 5, the method includes the following steps:

501: A base station sends a root key to an Hi AP.

The root key may be from an MME, which is not limited, and is used by the Hi AP to derive an encryption key used by the Hi AP.

502: The base station acquires an encryption algorithm used by the Hi AP.

The encryption algorithm is selected by the Hi AP according to a security capability and security policy of the Hi AP as well as a security capability of a UE.

503: The base station sends the encryption algorithm of the Hi AP to the UE so as to negotiate the encryption algorithm with the UE.

Both an Hi AP side and a UE side need to derive the encryption key based on the root key and the encryption algorithm. Therefore, a purpose for sending the encryption algorithm to the UE in this step is to enable, after the UE obtains the root key, the UE to obtain the encryption algorithm, so that the UE can derive the encryption key.

The UE derives an encryption key at the UE side according to the encryption algorithm sent by the base station and a root key in a UE card. Because the Hi AP side and the UE side use a same root key and a same encryption algorithm, encryption keys derived at both sides are also the same.

504: The base station instructs the Hi AP to start downlink encryption and uplink decryption and instructs, during algorithm negotiation, the UE to start downlink decryption and uplink encryption.

After receiving the encryption algorithm sent by the base station, the UE derives the encryption key according to the encryption algorithm and the root key in the UE card. After the base station instructs the Hi AP and the UE to start decryption and encryption, the Hi AP and the UE may encrypt uplink data and downlink data according to the same encryption algorithm and the encryption key.

In the embodiment of the present invention, an execution subject of selecting the encryption algorithm for the Hi AP side and deriving the encryption key for the Hi AP side is the Hi AP.

According to the method for establishing a security context provided in the embodiment of the present invention, an encryption algorithm can be selected by an Hi AP, and an encryption key can be derived according to a root key and the selected encryption algorithm. By means of algorithm negotiation, encryption generation, and synchronous encryption protection startup, encryption protection is performed on user plane data transmitted over a Uu' interface, which can solve a problem in the prior art that the user plane data transmitted over the Uu' interface is not protected and can implement comprehensive security protection for UE data.

Embodiment 6

Figure 6:
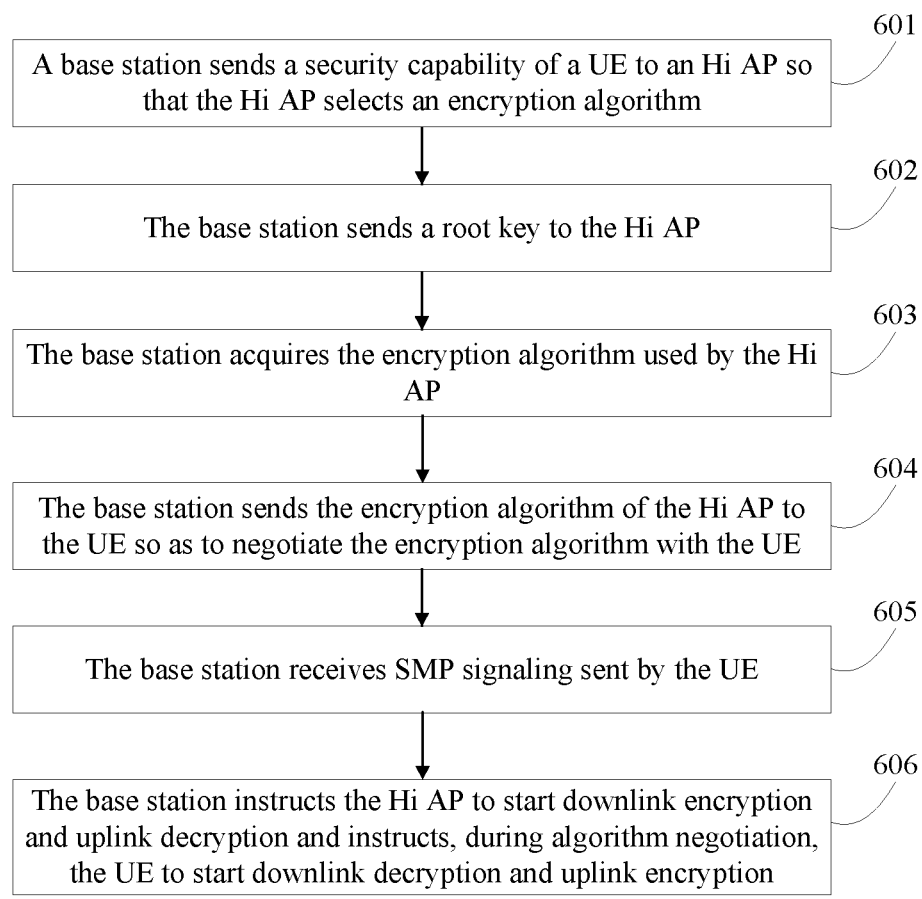
FIG. 6 is a flowchart of a method for establishing a security context in Embodiment 6 of the present invention.

The embodiment of the present invention provides a method for establishing a security context. The method is a further extension of Embodiment 5. As shown in FIG. 6, the method includes the following steps:

601: A base station sends a security capability of a UE to an Hi AP, so that the Hi AP selects an encryption algorithm.

The encryption algorithm is used to perform encryption protection on user plane data transmitted on an SCC. In the embodiment of the present invention, an AES algorithm used as the encryption algorithm is used as an example for description, which is not limited in a practical application.

602: The base station sends a root key to the Hi AP.

The root key may be from an MME, which is not limited, and is used by the Hi AP to derive an encryption key used by the Hi AP.

Because a symmetric key encryption method is used as an example for description in the embodiment of the present invention, a same root key is used to derive the encryption key at an Hi AP side and a UE side. In a practical application, a root key at the Hi AP side is delivered to the base station by the MME after authentication, and a root key at the UE side is derived according to a permanent key stored in a UE card. Because the root keys used at the Hi AP side and the UE side to derive the encryption key are the same and both used algorithms are an AES algorithm, encryption keys derived at the Hi AP side and the UE side are also the same.

The base station derives the encryption key according to the root key and the AES algorithm. The root key is derived according to a permanent key shared by the UE and a network side. The root key may be KeNB in the embodiment and is not limited in a practical application. The base station derives an encryption key Kupenc according to the KeNB and sends the Kupenc to the Hi AP. The Kupenc is used to perform encryption protection on the user plane data transmitted on the SCC.

603: The base station acquires the encryption algorithm used by the Hi AP.

The encryption algorithm is selected by the Hi AP according to a security capability and security policy of the Hi AP as well as the security capability of the UE.

604: The base station sends the encryption algorithm of the Hi AP to the UE so as to negotiate the encryption algorithm with the UE.

The base station sends an SMC to the UE, where the SMC carries the AES algorithm. After receiving the AES algorithm sent by the base station, the UE completes algorithm negotiation and derives, according to the AES algorithm and the KeNB authenticated by the UE and a network, the Kupenc.

Both the Hi AP side and the UE side need to derive the encryption key based on the root key and the encryption algorithm. Therefore, a purpose for sending the encryption algorithm to the UE in this step is to enable, after the UE obtains the root key, the UE to obtain the encryption algorithm, so that the UE can derive the encryption key.

It should be noted that a symmetric key encryption method is used as an example for description in the embodiment of the present invention and thus a same root key is used to derive the encryption key at the Hi AP side and the UE side. In a practical application, a root key at the Hi AP side is sent by a core network, and a root key at the UE side is locally derived according to a permanent key after authentication by the UE and a network. Because the root keys used at the Hi AP side and the UE side to derive the encryption key are the same and both used algorithms are an AES algorithm, encryption keys derived at the Hi AP side and the UE side are also the same.

Optionally, the root key used to derive the encryption key at the Hi AP side and the UE side may also be KeNB* that is derived according to the KeNB. In addition to deriving the encryption key for user plane data over a Uu interface, the KeNB is further used to derive the encryption key Kupenc for user plane data over a Uu interface as well as an integrity protection key Krrcint and an encryption key Krrcenc for control plane data over the Uu interface. When the Uu' interface uses the KeNB* to derive the root key, Kupenc* that is derived is different from the Kupenc derived for the Uu interface.

605: The base station receives SMP signaling sent by the UE.

The UE sends the SMP signaling to the base station, where the SMP signaling is used to notify the base station that the UE has completed encryption key derivation according to the encryption algorithm and the root key.

606: The base station instructs the Hi AP to start downlink encryption and uplink decryption and instructs, during algorithm negotiation, the UE to start downlink decryption and uplink encryption.

After receiving the encryption algorithm sent by the base station, the UE derives the encryption key according to the encryption algorithm and a root key in the UE card. After the base station instructs the Hi AP and the UE to start decryption and encryption, the Hi AP and the UE may encrypt uplink data and downlink data according to the same encryption algorithm and the encryption key.

In the embodiment of the present invention, an execution subject of selecting the encryption algorithm for the Hi AP side and deriving the encryption key for the Hi AP side is the Hi AP.

According to the method for establishing a security context provided in the embodiment of the present invention, an encryption algorithm can be selected by an Hi AP and an encryption key can be derived according to a root key and the selected encryption algorithm. By means of algorithm negotiation, encryption generation, and synchronous encryption protection startup, encryption protection is performed on user plane data transmitted over a Uu' interface on an SSC, which can solve a problem in the prior art that the user plane data transmitted over the Uu' interface is not protected and can implement comprehensive security protection for UE data.

In addition, according to the method for establishing a security context provided in the embodiment of the present invention, a root key different from a root key that is used to derive a key for a Uu interface may also be used to derive an encryption key for an Hi AP. For example, KeNB* derived according to KeNB may be used as the root key for the Hi AP to derive the encryption key. Using different root keys for data transmitted over a Uu interface and data transmitted over the Uu interface can further enhance data security.

Embodiment 7

Figure 7:
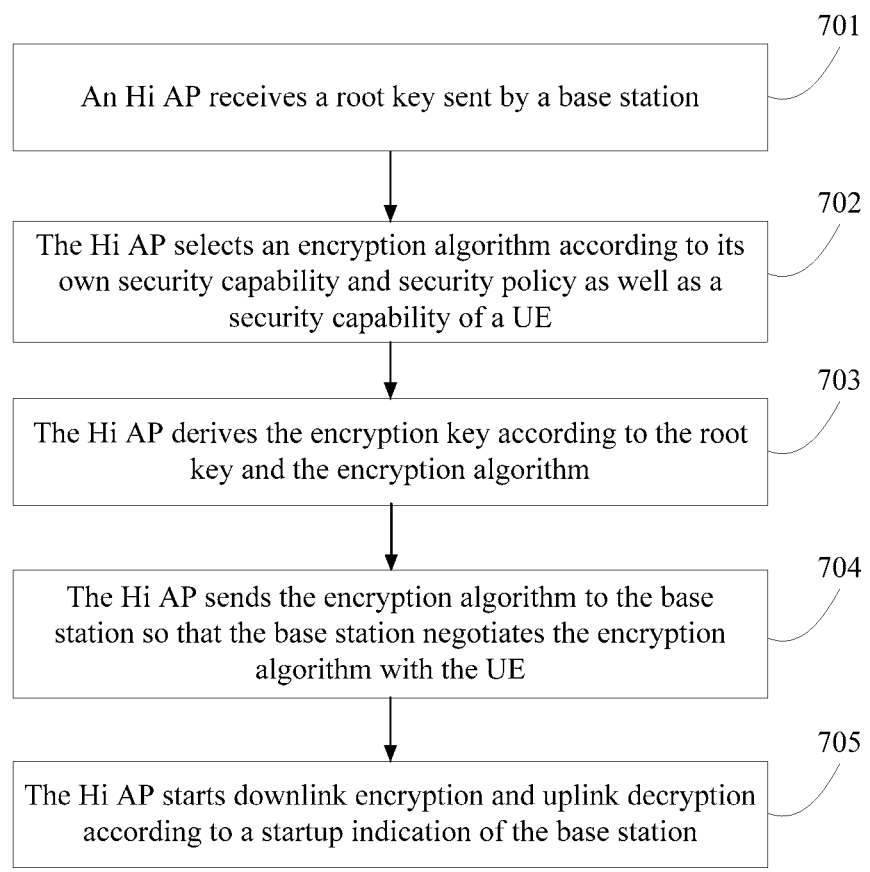
FIG. 7 is a flowchart of a method for establishing a security context in Embodiment 7 of the present invention.

The embodiment of the present invention provides a method for establishing a security context. As shown in FIG. 7, the method includes the following steps:

701: An Hi AP receives a root key sent by a base station.

The root key may be from an MME, which is not limited. The base station sends the root key to the Hi AP, so that the Hi AP derives an encryption key.

702: The Hi AP selects an encryption algorithm according to its own security capability and security policy as well as a security capability of a UE.

The Hi AP selects a highest-priority encryption algorithm according to its own security capability and security policy as well as the security capability of the UE.

703: The Hi AP derives the encryption key according to the root key and the encryption algorithm.

704: The Hi AP sends the encryption algorithm to the base station, so that the base station negotiates the encryption algorithm with the UE.

Both an Hi AP side and a UE side need to derive the encryption key based on the root key and the encryption algorithm. Therefore, a purpose for the base station to negotiate the encryption algorithm with the UE is to enable, after the UE obtains the root key, the UE to obtain the encryption algorithm, so that the UE can derive the encryption key.

The UE derives an encryption key at the UE side according to the encryption algorithm sent by the base station and a root key in a UE card. Because the Hi AP side and the UE side use a same root key and a same encryption algorithm, encryption keys derived at both sides are also the same.

705: The Hi AP starts downlink encryption and uplink decryption according to a startup indication of the base station.

After receiving the encryption algorithm sent by the base station, the UE derives the encryption key according to the encryption algorithm and the root key in the UE card. After the base station instructs the Hi AP and the UE to start decryption and encryption, the Hi AP and the UE may encrypt uplink data and downlink data according to the same encryption algorithm and the encryption key.

In the embodiment of the present invention, an execution subject of selecting the encryption algorithm for the Hi AP side and deriving the encryption key for the Hi AP side is the Hi AP.

According to the method for establishing a security context provided in the embodiment of the present invention, an encryption algorithm can be selected, and an encryption key can be derived according to a root key and the selected encryption algorithm. By means of algorithm negotiation, encryption generation, and synchronous encryption protection startup, encryption protection is performed on user plane data transmitted over a Uu' interface, which can solve a problem in the prior art that the user plane data transmitted over the Uu interface is not protected and can implement comprehensive security protection for UE data.

Embodiment 8

Figure 8:
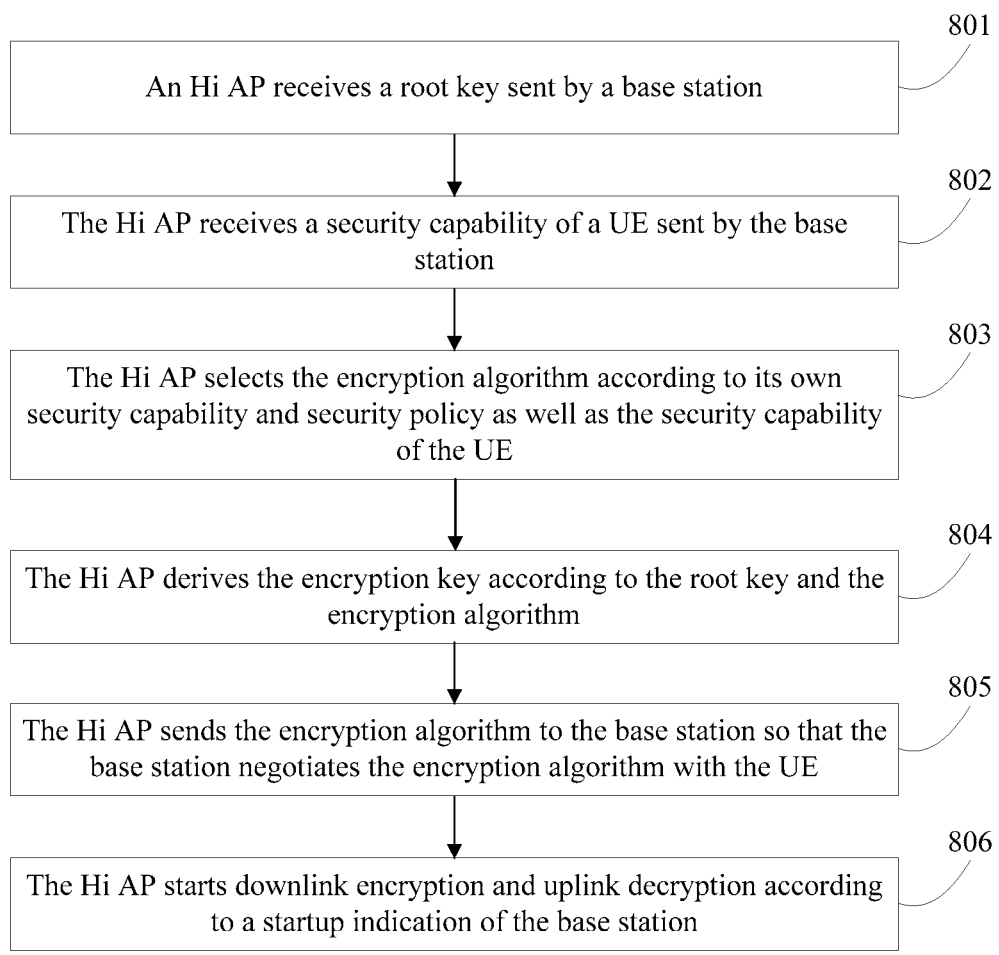
FIG. 8 is a flowchart of a method for establishing a security context in Embodiment 8 of the present invention.

The embodiment of the present invention provides a method for establishing a security context. The method is a further extension of Embodiment 7. As shown in FIG. 8, the method includes the following steps:

801: An Hi AP receives a root key sent by a base station.

The base station may acquire the root key from an MME, which is not limited in the embodiment of the present invention.

Because a symmetric key encryption method is used as an example for description in the embodiment of the present invention, a same root key is used to derive an encryption key at an Hi AP side and a UE side. In a practical application, a root key at the Hi AP side is delivered to the base station by the MME after authentication, and a root key at the UE side is derived according to a permanent key stored in a UE card. Because the root keys used at the Hi AP side and the UE side to derive the encryption key are the same and both used algorithms are an AES algorithm, encryption keys derived at the Hi AP side and the UE side are also the same.

802: The Hi AP receives a security capability of a UE sent by the base station.

An encryption algorithm is used to perform encryption protection on user plane data transmitted on an SCC. In the embodiment of the present invention, the AES algorithm used as the encryption algorithm is used as an example for description, which is not limited in a practical application.

803: The Hi AP selects the encryption algorithm according to its own security capability and security policy as well as the security capability of the UE.

The Hi AP selects a highest-priority encryption algorithm according to its own security capability and security policy as well as the security capability of the UE.

804: The Hi AP derives the encryption key according to the root key and the encryption algorithm.

The Hi AP derives the encryption key according to the root key and the AES algorithm. The root key is derived according to a permanent key shared by the UE and a network side. The root key may be KeNB in the embodiment and is not limited in a practical application. The Hi AP derives an encryption key Kupenc according to the KeNB, where the Kupenc is used to perform encryption protection on the user plane data transmitted on the SCC.

805: The Hi AP sends the encryption algorithm to the base station, so that the base station negotiates the encryption algorithm with the UE.

The base station sends an SMC to the UE, where the SMC carries the AES algorithm. After receiving the AES algorithm sent by the base station, the UE completes algorithm negotiation and derives, according to the AES algorithm and the KeNB authenticated by the UE and a network, the Kupenc.

Both the Hi AP side and the UE side need to derive the encryption key based on the root key and the encryption algorithm. Therefore, a purpose for sending the encryption algorithm to the UE in this step is to enable, after the UE obtains the root key, the UE to obtain the encryption algorithm, so that the UE can derive the encryption key.

Optionally, the root key used to derive the encryption key at the Hi AP side and the UE side may also be KeNB* that is derived according to the KeNB. In addition to deriving the encryption key for user plane data over a Uu' interface, the KeNB is further used to derive the encryption key Kupenc for user plane data over a Uu interface as well as an integrity protection key Krrcint and an encryption key Krrcenc for control plane data over the Uu interface. When the Uu' interface uses the KeNB* to derive the root key, Kupenc* that is derived is different from the Kupenc derived for the Uu interface.

806: The Hi AP starts downlink encryption and uplink decryption according to a startup indication of the base station.

Meanwhile, after receiving the encryption algorithm sent by the base station, the UE derives the encryption key according to the encryption algorithm and a root key in the UE card. After the base station instructs the Hi AP and the UE to start decryption and encryption, the Hi AP and the UE may encrypt uplink data and downlink data according to the same encryption algorithm and the encryption key.

In the embodiment of the present invention, an execution subject of selecting the encryption algorithm for the Hi AP side and deriving the encryption key for the Hi AP side is the Hi AP.

According to the method for establishing a security context provided in the embodiment of the present invention, an encryption algorithm can be selected, and an encryption key can be derived according to a root key and the selected encryption algorithm. By means of algorithm negotiation, encryption generation, and synchronous encryption protection startup, encryption protection is performed on user plane data transmitted over a Uu' interface on an SSC, which can solve a problem in the prior art that the user plane data transmitted over the Uu' interface is not protected and can implement comprehensive security protection for UE data.

In addition, according to the method for establishing a security context provided in the embodiment of the present invention, a root key different from a root key used to derive a key for a Uu interface may also be used to derive an encryption key. For example, KeNB* derived according to KeNB may be used as the root key for deriving the encryption key. Using different root keys for data transmitted over a Uu interface and data transmitted over the Uu' interface can further enhance data security.

Embodiment 9

Figure 9:
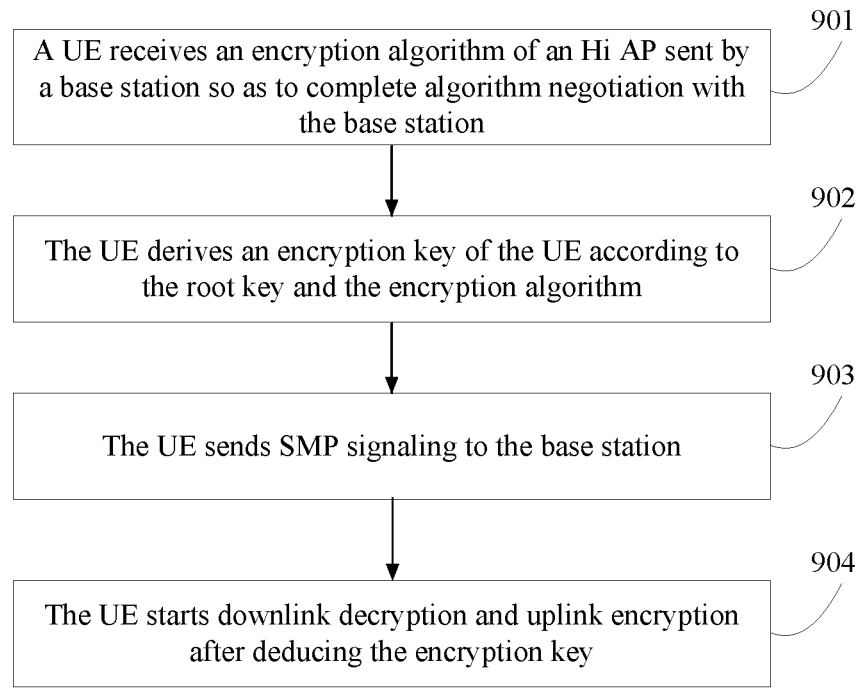
FIG. 9 is a flowchart of a method for establishing a security context in Embodiment 9 of the present invention.

The embodiment of the present invention provides a method for establishing a security context. As shown in FIG. 9, the method includes the following steps:

901: A UE receives an encryption algorithm of an Hi AP sent by a base station so as to complete algorithm negotiation with the base station.

Both an Hi AP side and a UE side need to derive an encryption key based on a root key and the encryption algorithm. Therefore, a purpose for the UE to receive the encryption algorithm sent by the base station in this step is to enable the UE to derive the encryption key according to the encryption algorithm and the root key.

The encryption algorithm is a highest-priority encryption algorithm selected by the Hi AP according to a security capability and security policy of the Hi AP as well as a security capability of the UE or a highest-priority encryption algorithm selected by the base station according to a security capability and a security policy of the Hi AP and a security capability of the UE.

902: The UE derives an encryption key of the UE according to the root key and the encryption algorithm.

Because a symmetric key encryption method is used as an example for description in the embodiment of the present invention, a same root key is used to derive the encryption key at the Hi AP side and the UE side. In a practical application, a root key at the Hi AP side is delivered to the base station by an MME after authentication, and a root key at the UE side is derived according to a permanent key stored in a UE card or derived after authentication by the UE and a network. Because the root keys used at the Hi AP side and the UE side to derive the encryption key are the same and used algorithms are also the same, encryption keys derived at the Hi AP side and the UE side are also the same.

903: The UE sends SMP signaling to the base station.

A purpose for the UE to send the SMP signaling to the base station is to notify the base station that the UE has derived the encryption key according to the root key and the encryption algorithm sent by the base station.

904: The UE starts downlink decryption and uplink encryption after deriving the encryption key.

After the base station instructs the Hi AP and the UE to start decryption and encryption, the Hi AP and the UE may encrypt uplink data and downlink data according to the same encryption algorithm and the encryption key.

According to the method for establishing a security context provided in the embodiment of the present invention, an encryption key used by a UE can be derived by the UE. By means of algorithm negotiation, encryption generation, and synchronous encryption protection startup, encryption protection is performed on user plane data transmitted over a Uu' interface on an SSC, which can solve a problem in the prior art that the user plane data transmitted over the Uu' interface is not protected and can implement comprehensive security protection for UE data.

Embodiment 10

Figure 10:
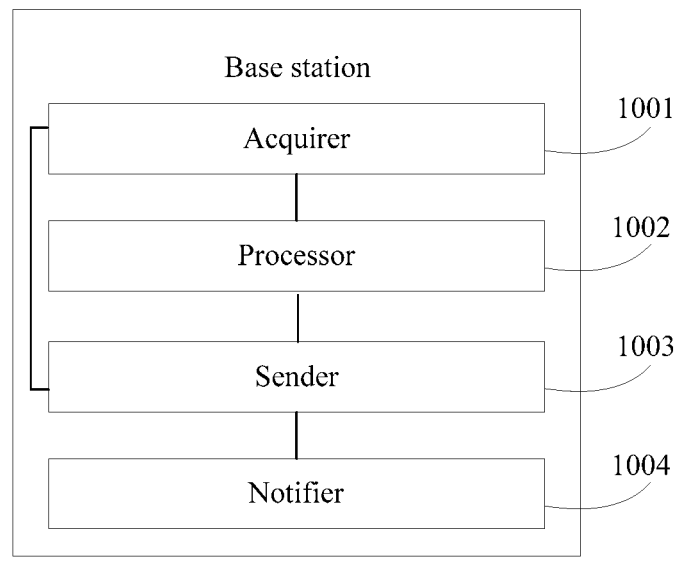
FIG. 10 is a schematic structural diagram of a base station in Embodiment 10 of the present invention.

With reference to implementation of Embodiment 2, the embodiment of the present invention provides a base station to implement Embodiment 2, as shown in FIG. 10. The base station includes an acquirer 1001, a processor 1002, a sender 1003, and a notifier 1004.

The acquirer 1001 is configured to acquire an encryption algorithm and a root key of an Hi AP.

The root key is used to derive an encryption key. The encryption key and the encryption algorithm are used to perform encryption protection on user plane data transmitted on an SCC. In the embodiment of the present invention, an AES algorithm used as the encryption algorithm is used as an example for description, which is not limited in a practical application.

The processor 1002 is connected to the acquirer 1001 and configured to derive an encryption key of the Hi AP according to the root key and the encryption algorithm acquired by the acquirer 1001.

Encryption key derivation needs to be performed at both an Hi AP side and a UE side. This step describes that the processor 1002 derives the encryption key of the Hi AP and an encryption key at the UE side is derived by a UE itself.

It should be noted that a symmetric key encryption method is used as an example for description in the embodiment of the present invention and thus a same root key is used by the processor 1002 and the UE to derive the encryption key.

The processor 1002 derives the encryption key according to the root key and the AES algorithm. The root key is derived according to a permanent key shared by the UE and a network side. The root key may be KeNB in the embodiment and is not limited in a practical application. The processor 1002 derives an encryption key Kupenc according to the KeNB and subsequently the sender 1003 sends the Kupenc to the Hi AP. The Kupenc is used to perform encryption protection on the user plane data transmitted on the SCC.

The sender 1003 is connected to the processor 1002 and the acquirer 1001, and is configured to send the encryption key derived by the processor 1002 and the encryption algorithm acquired by the acquirer 1001 to the Hi AP, so that the Hi AP starts downlink encryption and uplink decryption.

Because the base station selects the encryption algorithm and derives the encryption key for the Hi AP but a using subject of the encryption algorithm and the encryption key is the Hi AP, the sender 1003 in the base station sends the encryption key and the encryption algorithm to the Hi AR, so that the Hi AP starts downlink encryption and uplink decryption.

The sender 1003 is configured to send the encryption algorithm acquired by the acquirer 1001 to the UE so as to negotiate the encryption algorithm with the UE.

The sender 1003 sends a security mode command (Security Mode Command, SMC) to the UE, where the SMC carries the AES algorithm. After receiving the AES algorithm sent by the sender 1003, the UE completes algorithm negotiation and derives, according to the AES algorithm and the KeNB authenticated by the UE and a network, the Kupenc.

Both the Hi AP side and the UE side need to derive the encryption key based on the root key and the encryption algorithm. Therefore, a purpose for the sender 1003 to send the encryption algorithm to the UE in this step is to enable, after the UE obtains the root key, the UE to obtain the encryption algorithm, so that the UE can derive the encryption key.

The notifier 1004 is configured to instruct the Hi AP to start downlink encryption and uplink decryption and instruct, during algorithm negotiation, the UE to start downlink decryption and uplink encryption.

After both the Hi AP side and the UE side derive the encryption key, the notifier 1004 instructs, when the Hi AP starts downlink encryption and uplink decryption, the UE to start downlink decryption and uplink encryption. Because the Hi AP is a sender of downlink data and a receiver of uplink data, the Hi AP starts downlink encryption and uplink decryption. Likewise, because the UE is a receiver of the downlink data and a sender of the uplink data, the UE starts downlink decryption and uplink encryption.

Figure 11:
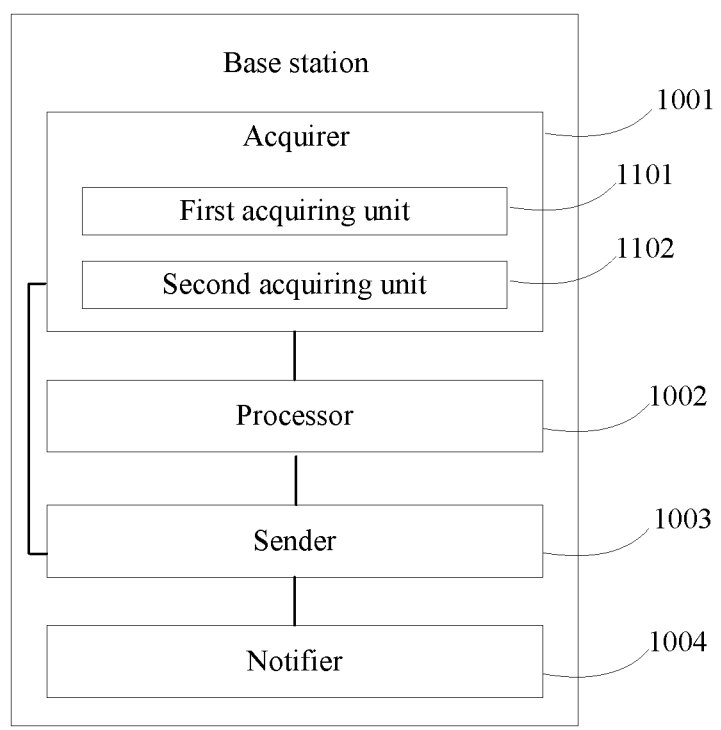
FIG. 11 is a schematic structural diagram of a base station in Embodiment 10 of the present invention.

Furthermore, as shown in FIG. 11, the acquirer 1001 may include:

a first acquiring unit 1101, configured to acquire the encryption algorithm selected by the Hi AP, where the encryption algorithm is selected by the Hi AP according to a security capability and security policy of the Hi AP as well as a security capability of the UE: and a second acquiring unit 1102, configured to select the encryption algorithm according to the security capability and security policy of the Hi AP and the security capability of the UE.

Furthermore, the sender 1003 is further configured to send the security capability of the UE to the Hi AP, so that the Hi AP selects the encryption algorithm according to its own security capability and security policy as well as the security capability of the UE.

Figure 12:
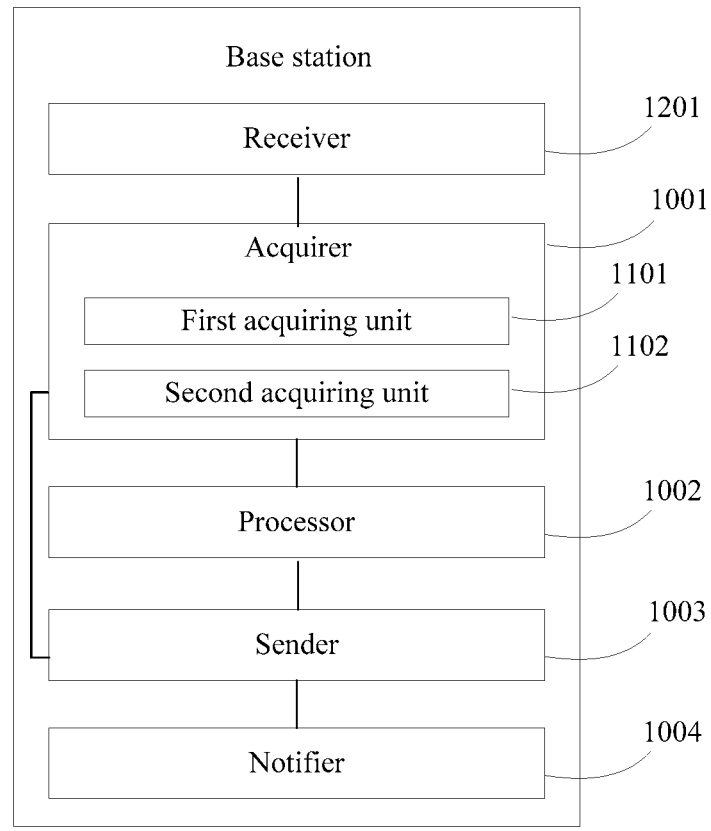
FIG. 12 is a schematic structural diagram of a base station in Embodiment 10 of the present invention.

Furthermore, as shown in FIG. 12, the base station may include:

a receiver 1201, where the receiver 1201 is connected to the acquirer 1001 and configured to receive the security capability and the security policy sent by the Hi AP, so that the second acquiring unit 1102 in the acquirer 1001 selects the encryption algorithm according to the security capability and security policy of the Hi AP and the security capability of the UE.

Optionally, further, the root key is a root key that is used to derive an integrity protection key and an encryption key on an interface between the base station and the UE or a subkey derived according to a root key that is used to derive an integrity protection key and an encryption key on an interface between the base station and the UE.

According to the base station provided in the embodiment of the present invention, encryption algorithms of an Hi AP and a UE can be acquired, and encryption keys used by the Hi AP and the UE can be derived at a base station side and a UE side according to a root key and the acquired encryption algorithms. By means of algorithm negotiation, encryption generation, and synchronous encryption protection startup, encryption protection is performed on user plane data transmitted over a Uu interface on an SSC, which can solve a problem in the prior art that the user plane data transmitted over the Uu' interface is not protected and can implement comprehensive security protection for UE data.

In addition, according to the base station provided in the embodiment of the present invention, a root key different from a root key that is used to derive a key for a Uu interface may also be used to derive an encryption key for an Hi A. For example, KeNB* derived according to KeNB may be used as the root key for the Hi AP to derive the encryption key. Using different root keys for data transmitted over a Uu interface and data transmitted over the Uu' interface can further enhance data security.

In addition, according to the base station provided in the embodiment of the present invention, in an algorithm negotiation phase, the base station represents the Uu interface and the Uu' interface at the same time to perform algorithm negotiation with a UE, which reduces steps of signaling interaction.

Embodiment 11

Figure 13:
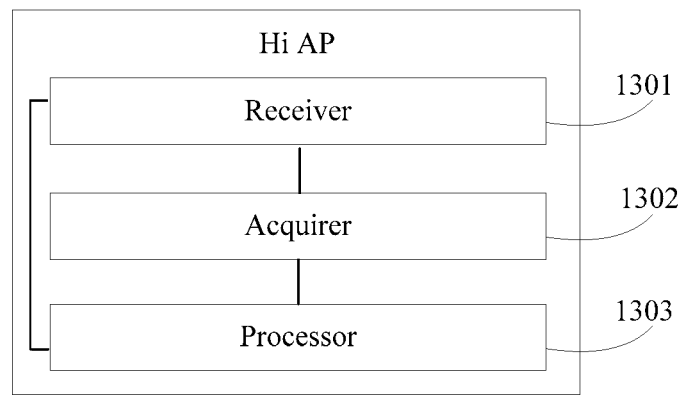
FIG. 13 is a schematic structural diagram of an Hi AP in Embodiment 11 of the present invention.

With reference to implementation of Embodiment 4, the embodiment of the present invention provides an access node to implement Embodiment 4, as shown in FIG. 13. An Hi AP used as the access node is used as an example. The Hi AP includes a receiver 1301, an acquirer 1302, and a processor 1303.

The receiver 1301 is configured to receive an encryption key sent by a base station.

Encryption key derivation needs to be performed at both an Hi AP side and a UE side. This step describes that the Hi AP derives an encryption key and an encryption key at the UE side is derived by a UE itself.

The acquirer 1302 is configured to acquire an encryption algorithm.

The encryption algorithm is used to perform encryption protection on user plane data transmitted on an SCC. In the embodiment of the present invention, it is assumed that an AES algorithm is used as the encryption algorithm, which is not limited in a practical application.

The processor 1303 is connected to the receiver 1301 and the acquirer 1302, and is configured to start, according to the encryption key received by the receiver 1301 and the encryption algorithm acquired by the acquirer 1302, downlink encryption and uplink decryption.

Meanwhile, the base station sends the encryption algorithm to the UE to complete algorithm negotiation with the UE.

Figure 14:
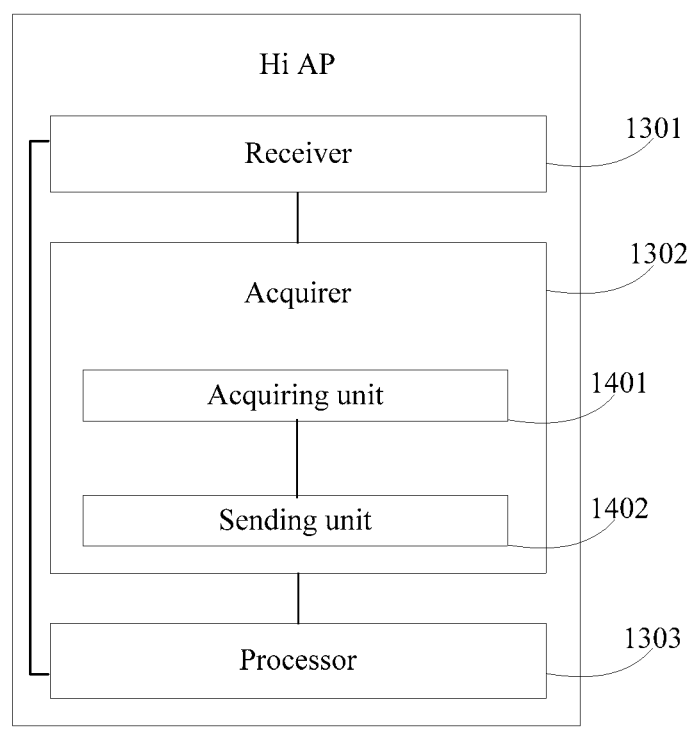
FIG. 14 is a schematic structural diagram of an Hi AP in Embodiment 11 of the present invention.

Furthermore, as shown in FIG. 14, the acquirer 1302 may include:

an acquiring unit 1401, configured to acquire the encryption algorithm sent by the base station, where the encryption algorithm is selected by the base station, where the acquiring unit 1401 is further configured to select the encryption algorithm according to its own security capability and security policy as well as a security capability of the UE; and a sending unit 1402, connected to the acquiring unit 1401 and configured to send the encryption algorithm selected by the acquiring unit 1401 to the base station.

Furthermore, the receiver 1301 is connected to the acquirer 1302 and configured to receive the security capability of the UE sent by the base station, where the security capability of the UE is used by the acquiring unit 1401 in the acquirer 1302 to select the encryption algorithm.

Figure 15:
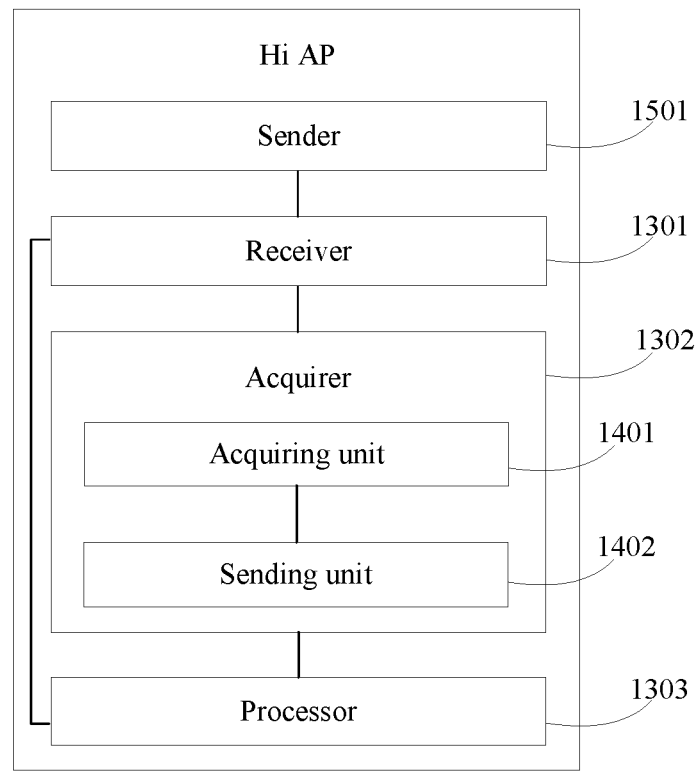
FIG. 15 is a schematic structural diagram of an Hi AP in Embodiment 11 of the present invention.

Furthermore, as shown in FIG. 15, the Hi AP may include:

a sender 1501, configured to send its own security capability and security policy to the base station, so that the base station selects the encryption algorithm for the Hi AP.

According to the Hi AP provided in the embodiment of the present invention, by means of algorithm negotiation, encryption generation, and synchronous startup of downlink encryption and uplink decryption, encryption protection can be performed, according to an encryption algorithm and an encryption key sent by a base station, on user plane data transmitted over a Uu' interface on an SSC, which can solve a problem in the prior art that the user plane data transmitted over the Uu' interface is not protected and can implement comprehensive security protection for UE data.

Embodiment 12

Figure 16:
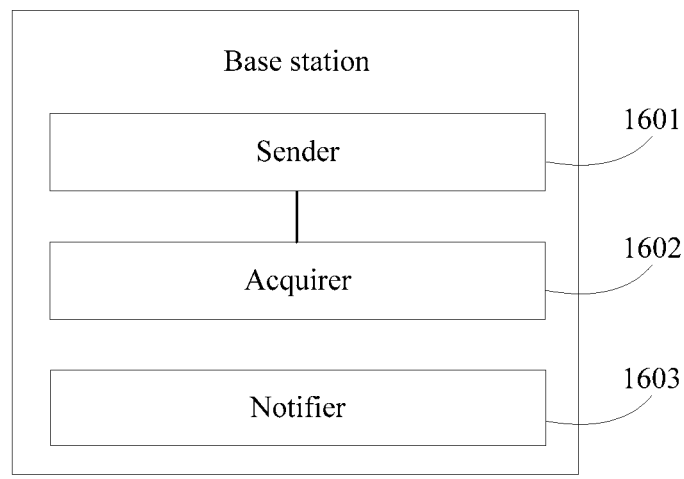
FIG. 16 is a schematic structural diagram of a base station in Embodiment 12 of the present invention.

With reference to implementation of Embodiment 6, the embodiment of the present invention provides a base station to implement Embodiment 6. As shown in FIG. 16, the base station includes a sender 1601, an acquirer 1602, and a notifier 1603.

The sender 1601 is configured to send a root key to an Hi AP, where the root key is used by the Hi AP to derive an encryption key used by the Hi AR.

The acquirer 1602 is configured to acquire an encryption algorithm used by the Hi AP, where the encryption algorithm is selected by the Hi AP according to a security capability and security policy of the Hi AP as well as a security capability of a UE.

The sender 1601 is connected to the acquirer 1602 and configured to send the encryption algorithm acquired by the acquirer 1602 to the UE so as to negotiate the encryption algorithm with the UE.

The sender 1601 sends an SMC to the UE, where the SMC carries an AES algorithm. After receiving the AES algorithm sent by the sender 1601, the UE completes algorithm negotiation and derives, according to the AES algorithm and KeNB authenticated by the UE and a network, Kupenc.

Both an Hi AP side and a UE side need to derive the encryption key based on the root key and the encryption algorithm. Therefore, a purpose for sending the encryption algorithm to the UE in this step is to enable, after the UE obtains the root key, the UE to obtain the encryption algorithm, so that the UE can derive the encryption key.

It should be noted that a symmetric key encryption method is used as an example for description in the embodiment of the present invention and thus a same root key is used to derive the encryption key at the Hi AP side and the UE side. In a practical application, a root key at the Hi AP side is sent by a core network, and a root key at the UE side is locally derived according to a permanent key after authentication by the UE and a network. Because the root keys used at the Hi AP side and the UE side to derive the encryption key are the same and both used algorithms are an AES algorithm, encryption keys derived at the Hi AP side and the UE side are also the same.

The notifier 1603 is configured to instruct the Hi AP to start downlink encryption and uplink decryption and instruct, during algorithm negotiation, the UE to start downlink decryption and uplink encryption.

After receiving the encryption algorithm sent by the sender 1601, the UE derives the encryption key according to the encryption algorithm and a root key in a UE card. After the notifier 1603 instructs the Hi AP and the UE to start decryption and encryption, the Hi AP and the UE may encrypt uplink data and downlink data according to the same encryption algorithm and the encryption key.

Furthermore, the sender 1601 is further configured to send the security capability of the UE to the Hi AR so that the Hi AP selects the encryption algorithm.

Furthermore, the root key is a root key that is used to derive an integrity protection key and an encryption key on an interface between the base station and the UE or a subkey derived according to a root key that is used to derive an integrity protection key and an encryption key on an interface between the base station and the UE.

According to the base station provided in the embodiment of the present invention, an encryption algorithm can be selected by an Hi AP, and an encryption key can be derived according to a root key and the selected encryption algorithm. By means of algorithm negotiation, encryption generation, and synchronous encryption protection startup, encryption protection is performed on user plane data transmitted over a Uu' interface on an SSC, which can solve a problem in the prior art that the user plane data transmitted over the Uu interface is not protected and can implement comprehensive security protection for UE data.

In addition, according to the base station provided in the embodiment of the present invention, a root key different from a root key that is used to derive a key for a Uu interface may also be used to derive an encryption key for an Hi AP. For example, KeNB* derived according to KeNB may be used as the root key for the Hi AP to derive the encryption key. Using different root keys for data transmitted over a Uu interface and data transmitted over the Uu' interface can further enhance data security.

Embodiment 13

Figure 17:
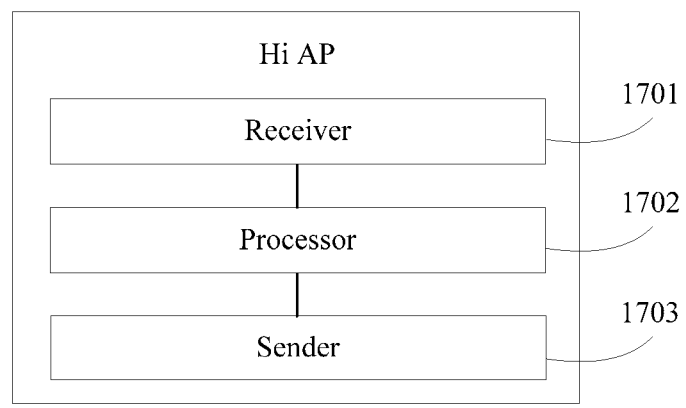
FIG. 17 is a schematic structural diagram of an Hi AP in Embodiment 13 of the present invention.

With reference to implementation of Embodiment 8, the embodiment of the present invention provides an access node to implement Embodiment 8. As shown in FIG. 17, an Hi AP used as the access node is used as an example. The Hi AP includes a receiver 1701, a processor 1702, and a sender 1703.

The receiver 1701 is configured to receive a root key sent by a base station.

The base station may acquire the root key from an MME, which is not limited in the embodiment of the present invention.

Because a symmetric key encryption method is used as an example for description in the embodiment of the present invention, a same root key is used to derive an encryption key at an Hi AP side and a UE side. In a practical application, a root key at the Hi AP side is delivered to the base station by the MME after authentication, and a root key at the UE side is derived according to a permanent key stored in a UE card. Because the root keys used at the Hi AP side and the UE side to derive the encryption key are the same and both used algorithms are an AES algorithm, encryption keys derived at the Hi AP side and the UE side are also the same.

The processor 1702 is configured to select an encryption algorithm according to its own security capability and security policy as well as a security capability of a UE.

The processor 1702 selects a highest-priority encryption algorithm according to its own security capability and security policy as well as the security capability of the UE.

The encryption algorithm is used to perform encryption protection on user plane data transmitted on an SCC. In the embodiment of the present invention, the AES algorithm used as the encryption algorithm is used as an example for description, which is not limited in a practical application.

The processor 1702 is connected to the receiver 1701 and configured to derive, according to the root key received by the receiver 1701 and the encryption algorithm, the encryption key.

The sender 1703 is connected to the processor 1702 and configured to send the encryption algorithm selected by the processor 1702 to the base station, so that the base station negotiates the encryption algorithm with the UE.

The processor 1702 is configured to start downlink encryption and uplink decryption according to a startup indication of the base station.

Furthermore, the receiver 1701 is further configured to receive the security capability of the UE sent by the base station, where the security capability of the UE is used by the processor 1702 to select the encryption algorithm.

Furthermore, the root key is a root key that is used to derive an integrity protection key and an encryption key on an interface between the base station and the UE or a subkey derived according to a root key that is used to derive an integrity protection key and an encryption key on an interface between the base station and the UE.

According to the Hi AP provided in the embodiment of the present invention, an encryption algorithm can be selected, and an encryption key can be derived according to a root key and the selected encryption algorithm. By means of algorithm negotiation, encryption generation, and synchronous encryption protection startup, encryption protection is performed on user plane data transmitted over a Uu' interface on an SSC, which can solve a problem in the prior art that the user plane data transmitted over the Uu' interface is not protected and can implement comprehensive security protection for UE data.

In addition, according to the Hi AP provided in the embodiment of the present invention, a root key different from a root key that may also be used to derive a key for a Uu interface may also be used to derive an encryption key. For example, KeNB* derived according to KeNB may be used as the root key for deriving the encryption key. Using different root keys for data transmitted over a Uu interface and data transmitted over the Uu' interface can further enhance data security.

Embodiment 14

Figure 18:
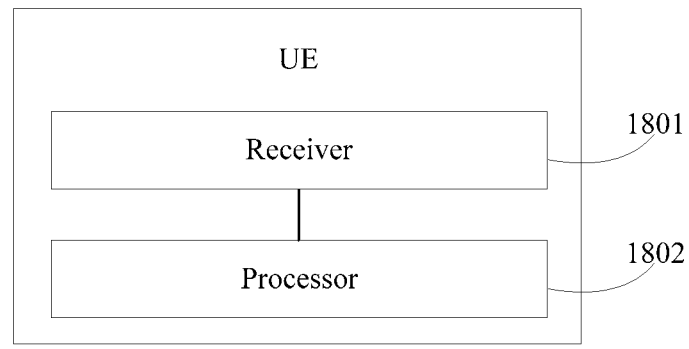
FIG. 18 is a schematic structural diagram of a UE in Embodiment 14 of the present invention.

With reference to implementation of Embodiment 9, the embodiment of the present invention provides a user equipment UE to implement Embodiment 9. As shown in FIG. 18, the UE includes a receiver 1801 and a processor 1802.

The receiver 1801 is configured to receive an encryption algorithm of an Hi AP sent by a base station so as to complete algorithm negotiation with the base station.

Both an Hi AP side and a UE side need to derive an encryption key based on a root key and the encryption algorithm. Therefore, a purpose for the receiver 1801 to receive the encryption algorithm sent by the base station in this step is to enable the processor 1802 to subsequently derive the encryption key according to the encryption algorithm and the root key.

The encryption algorithm is a highest-priority encryption algorithm selected by the Hi AP according to a security capability and security policy of the Hi AP as well as a security capability of the UE or a highest-priority encryption algorithm selected by the base station according to a security capability and a security policy of the Hi AP and a security capability of the UE.

The processor 1802 is connected to the receiver 1801 and configured to derive, according to the root key and the encryption algorithm received by the receiver 1801, an encryption key of the UE, where the root key is derived after authentication by the processor 1802 and a network.

The processor 1802 is further configured to start downlink decryption and uplink encryption after deriving the encryption key of the UE.

Because a symmetric key encryption method is used as an example for description in the embodiment of the present invention, a same root key is used to derive the encryption key at the Hi AP side and the UE side. In a practical application, a root key at the Hi AP side is delivered to the base station by an MME after authentication, and a root key at the UE side is derived according to a permanent key stored in a UE card or derived after authentication by the UE and a network. Because the root keys used at the Hi AP side and the UE side to derive the encryption key are the same and used algorithms are the same, encryption keys derived at the Hi AP side and the UE side are also the same.

According to the UE provided in the embodiment of the present invention, an encryption key used by the UE can be derived by the UE. By means of algorithm negotiation, encryption generation, and synchronous encryption protection startup, encryption protection is performed on user plane data transmitted over a Uu' interface on an SSC, which can solve a problem in the prior art that the user plane data transmitted over the Uu interface is not protected and can implement comprehensive security protection for UE data.

Embodiment 15

With reference to implementation of Embodiments 1 to 4 and Embodiment 9, the embodiment of the present invention provides a system for establishing a security context. The system includes a base station, an access node, and a UE, the UE is connected to a core network by using a Uu interface through the base station and connected to the core network by using a Uu' interface through the access node.

The base station is configured to acquire an encryption algorithm of the access node; acquire a root key; derive an encryption key of the access node according to the root key and the encryption algorithm: send the encryption key and the encryption algorithm to the access node, so that the access node starts downlink encryption and uplink decryption: send the encryption algorithm of the access node to the UE so as to negotiate the encryption algorithm with the UE; instruct the access node to start downlink encryption and uplink decryption; and instruct, during algorithm negotiation, the UE to start downlink decryption and uplink encryption.

The access node is configured to receive the encryption key sent by the base station, acquire the encryption algorithm, and start, according to the encryption key and the encryption algorithm, downlink encryption and uplink decryption.

The UE is configured to receive the encryption algorithm of the access node sent by the base station so as to complete algorithm negotiation with the base station: derive an encryption key of the UE according to the root key and the encryption algorithm, where the root key is derived after authentication by the UE and a network; and start downlink decryption and uplink encryption after deriving the encryption key of the UE.

According to the system for establishing a security context provided in the embodiment of the present invention, an encryption algorithm can be selected for an access node and an encryption key can be derived for the access node according to a root key and the selected encryption algorithm. By means of algorithm negotiation, encryption generation, and synchronous encryption protection startup, encryption protection is performed on user plane data transmitted over a Uu' interface, which can solve a problem in the prior art that the user plane data transmitted over the Uu interface is not protected and can implement comprehensive security protection for UE data.

Embodiment 16

With reference to implementation of Embodiments 5 to 9, the embodiment of the present invention provides a system for establishing a security context. The system includes a base station, an access node, and a UE. The UE is connected to a core network by using a Uu interface through the base station and connected to the core network by using a Uu' interface through the access node.

The base station is configured to send a root key to the access node, where the root key is used by the access node to derive an encryption key used by the access node; acquire an encryption algorithm used by the access node, where the encryption algorithm is selected by the access node according to a security capability and security policy of the access node as well as a security capability of the UE; send the encryption algorithm of the access node to the UE so as to negotiate the encryption algorithm with the UE, instruct the access node to start downlink encryption and uplink decryption; and instruct, during algorithm negotiation, the UE to start downlink decryption and uplink encryption.

The access node is configured to receive the root key sent by the base station, select the encryption algorithm according to its own security capability and security policy as well as the security capability of the UE, derive the encryption key according to the root key and the encryption algorithm, send the encryption algorithm to the base station, so that the base station negotiates the encryption algorithm with the UE, and start, according to a startup indication of the base station, downlink encryption and uplink decryption.

The UE is configured to receive the encryption algorithm of the access node sent by the base station so as to complete algorithm negotiation with the base station; derive an encryption key of the UE according to the root key and the encryption algorithm, where the root key is derived after authentication by the UE and a network; and start downlink decryption and uplink encryption after deriving the encryption key of the UE.

According to the system for establishing a security context provided in the embodiment of the present invention, an encryption algorithm can be selected by an access node, and an encryption key can be derived by the access node according to a root key and the selected encryption algorithm. By means of algorithm negotiation, encryption generation, and synchronous encryption protection startup, encryption protection is performed on user plane data transmitted over a Uu' interface, which can solve a problem in the prior art that the user plane data transmitted over the Uu' interface is not protected and can implement comprehensive security protection for UE data.

Through description in the foregoing embodiments, a person skilled in the art may understand clearly that the present invention may be implemented through software and necessary general hardware or through hardware only. However, the former is a better implementation manner in most cases.

Based on such an understanding, the technical solutions in the present invention essentially, or the part contributing to the prior art may be implemented in a form of a software product. The computer software product is stored in a readable storage medium such as a floppy disk, a hard disk, or a compact disk of a computer and includes several instructions to cause a computer device (which may be a personal computer, a server, or a network device) to execute the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
   sending, by a base station, a root key to an access node;
   identifying, by the base station, an encryption algorithm to be used by the access node;
   sending, by the base station, the encryption algorithm of the access node to a user equipment (UE);
   receiving, by the base station and from the UE, signaling indicating that the UE has derived an encryption key according to the root key and the encryption algorithm; and
   in response to receiving the signaling, indicating, by the base station, the access node to perform downlink encryption and uplink decryption.

2. The method according to claim 1, further comprising:
   sending, by the base station, a security capability of the UE to the access node.

3. A method comprising:
   receiving, by an access node, a root key sent by a base station;
   determining, by the access node, an encryption algorithm according a security capability of the access node, a security policy of the access node, and a security capability of a user equipment (UE);
   determining, by the access node, an encryption key according to the root key and the encryption algorithm;
   sending, by the access node, the encryption algorithm to the base station; and
   performing, by the access node, downlink encryption and uplink decryption according to a startup indication of the base station, wherein the startup indication is indicated by the base station after receiving signaling from the UE indicating that the UE has derived an encryption key according to the root key and the encryption algorithm.

4. The method according to claim 3, further comprising:
   receiving, by the access node, the security capability of the UE.

5. A method comprising:
   receiving, by a communication apparatus and from a base station, an encryption algorithm of an access node;
   determining, by the communication apparatus, an encryption key of the communication apparatus according to a root key and the encryption algorithm;
   sending, by the communication apparatus to the base station, signaling indicating that the UE has derived the encryption key according to the root key and the encryption algorithm; and
   performing, by the communication apparatus, downlink decryption and uplink encryption over an air interface between the communication apparatus and the access node.

6. A base station comprising:
   at least one hardware processor; and
   a non-transitory computer-readable storage medium coupled to the at least one hardware processor and storing programming instructions for execution by the at least one hardware processor, the programming instructions instructing the at least one hardware processor to perform operations comprising:
   sending a root key to an access node;
   identifying an encryption algorithm to be used by the access node;
   sending the encryption algorithm to a user equipment (UE);
   receiving, from the UE, signaling indicating that the UE has derived an encryption key according to the root key and the encryption algorithm; and
   in response to receiving the signaling, indicating the access node to perform downlink encryption and uplink decryption.

7. The base station according to claim 6, the operations further comprises sending a security capability of the UE to the access node.

8. An access node comprising:
   at least one hardware processor; and
   a non-transitory computer-readable storage medium coupled to the at least one hardware processor and storing programming instructions for execution by the at least one hardware processor to perform operations comprising:
   receiving a root key sent by a base station;
   determining an encryption algorithm according to a security capability of the access node, a security policy of the access node, and a security capability of a user equipment (UE);
   determining an encryption key according to the root key received by the receiver and the encryption algorithm; and
   sending the encryption algorithm to the base station; and
   performing downlink encryption and uplink decryption according to a startup indication of the base station, wherein the startup indication is indicated by the base station after receiving signaling from the UE indicating that the UE has derived an encryption key according to the root key and the encryption algorithm.

9. The access node according to claim 8, wherein operations further comprising receiving the security capability of the UE sent by the base station.

10. A communication apparatus comprising:
at least one hardware processor coupled to a memory storing programming instructions for execution by the at least one hardware processor to perform operations comprising:
receiving an encryption algorithm of an access node sent by a base station;
determining, according to a root key and the encryption algorithm, an encryption key of the communication apparatus;
sending to the base station signaling indicating that the communication apparatus has derived the encryption key according to the root key and the encryption algorithm; and
performing downlink decryption and uplink encryption over an air interface between the communication apparatus and the access node.

11. A method comprising:
sending, by a base station, a root key to an access node;
determining, by the access node, an encryption algorithm according a security capability of the access node, a security policy of the access node, and a security capability of a user equipment (UE);
determining, by the access node, an encryption key according to the root key and the encryption algorithm;
sending, by the access node, the encryption algorithm to the base station;
sending, by the base station, the encryption algorithm to the UE;
determining, by the UE, the encryption key according to the root key and the encryption algorithm;
sending, by the UE, signaling to the base station to indicate that the UE has derived the encryption key;
indicating, by the base station, the access node to perform downlink encryption and uplink decryption; and
performing, by the access node, downlink encryption and uplink decryption according to a startup indication of the base station.

12. A system comprising:
a base station, an access node and a user equipment (UE);
the base station being configured to connect the UE by a first air interface, and send a root key to the access node,
the access node being configured to:
connect the UE by a second air interface;
determine an encryption algorithm according a security capability of the access node, a security policy of the access node, and a security capability of the UE;
determine an encryption key according to the root key and the encryption algorithm;
send the encryption algorithm to the base station;

the base station further being configured to:
send the encryption algorithm to the UE; and
indicate the access node to perform downlink encryption and uplink decryption;
the access node further being configured to perform downlink encryption and uplink decryption according to a startup indication from the base station;
the UE being configured to determine the encryption key according to the root key and the encryption algorithm, and send signaling to the base station to indicate that the UE has determined the encryption key.

13. A non-transitory computer-readable storage medium storing one or more instructions executable by at least one processor to perform operations comprising:
sending a root key to an access node;
identifying an encryption algorithm to be used by the access node;
sending the encryption algorithm of the access node to a user equipment (UE);
receiving signaling indicating that the UE has derived an encryption key according to the root key and the encryption algorithm; and
in response to receiving the signaling, indicating the access node to perform downlink encryption and uplink decryption.

14. A non-transitory computer-readable storage medium storing one or more instructions executable by at least one processor to perform operations comprising:
receiving a root key sent by a base station;
determining an encryption algorithm according a security capability of an access node, a security policy of the access node, and a security capability of a user equipment (UE);
determining an encryption key according to the root key and the encryption algorithm;
sending the encryption algorithm to the base station; and
performing downlink encryption and uplink decryption according to a startup indication of the base station, wherein the startup indication is indicated by the base station after receiving signaling from the UE indicating that the UE has derived an encryption key according to the root key and the encryption algorithm.

15. A non-transitory computer-readable storage medium storing one or more instructions executable by at least one processor to perform operations comprising:
receiving, from a base station, an encryption algorithm of an access node;
determining an encryption key of a user equipment (UE) according to a root key and the encryption algorithm;
sending, to the base station, signaling indicating that the UE has derived the encryption key according to the root key and the encryption algorithm; and
performing downlink decryption and uplink encryption over an air interface between the UE and the access node.

* * * * *

UNITED STATES PATENT AND TRADEMARK OFFICE
CERTIFICATE OF CORRECTION

| | | |
|---|---|---|
| PATENT NO. | : 11,659,393 B2 | |
| APPLICATION NO. | : 17/030926 | |
| DATED | : May 23, 2023 | |
| INVENTOR(S) | : Dongmei Zhang and Jing Chen | |

It is certified that error appears in the above-identified patent and that said Letters Patent is hereby corrected as shown below:

On the Title Page

(56) References Cites, OTHER PUBLICATIONS, Column 2/Line 3 – Delete "Svstem" and insert -- System --.

In the Claims

Column 28/Line 20 – In Claim 5 delete "UE" and insert -- communication apparatus --.

Signed and Sealed this
Eighth Day of August, 2023

Katherine Kelly Vidal
Director of the United States Patent and Trademark Office